United States Patent [19]

Morrison

[11] Patent Number: 5,113,286

[45] Date of Patent: May 12, 1992

[54] DIFFRACTION GRATING APPARATUS AND METHOD OF FORMING A SURFACE RELIEF PATTERN IN DIFFRACTION GRATING APPARATUS

[75] Inventor: Rick L. Morrison, Naperville, Ill.

[73] Assignee: AT&T Bell Laboratories, Murray Hill, N.J.

[21] Appl. No.: 589,469

[22] Filed: Sep. 27, 1990

[51] Int. Cl.$^5$ .................. G02B 5/18; G02B 27/44
[52] U.S. Cl. .................... 359/569; 359/571; 359/575
[58] Field of Search ............ 350/3.72, 3.73, 162.16, 350/162.17, 162.2, 162.22, 162.23; 359/569, 571, 575

[56] References Cited

U.S. PATENT DOCUMENTS

| | | | |
|---|---|---|---|
| 3,785,736 | 1/1974 | Spitz et al. | 350/3.73 |
| 4,585,307 | 4/1986 | Dammann et al. | 350/162.22 |
| 4,679,901 | 7/1987 | Dammann et al. | 350/162.2 |
| 4,846,552 | 7/1989 | Veldkamp et al. | 350/162.2 |
| 4,895,790 | 1/1990 | Swanson et al. | 350/162.2 |

OTHER PUBLICATIONS

H. Dammann et al., "High-Efficiency In-Line Multiple Imaging by Means of Multiple Phase Holograms", *Optics Communications*, vol. 3, No. 5, Jul. 1971, pp. 312-315.
H. Dammann et al., "Coherent Optical Generation and Inspection of Two-Dimensional Periodic Structures", *Optic Acta*, 1977, vol 24, No. 4, pp. 505-515.
U. Kollat et al., "Binary Phase Gratings for Star Couplers with High Splitting Ratio", *Fiber and Integrated Optics*, 1982, vol. 4, No. 2, pp. 159-167.
F. B. McCormick, "Generation of Large Spot Arrays from a Single Laser Beam by Multiple Imaging with Binary Phase Gratings", *Optical Engineering*, Apr. 1989, vol. 28, No. 4, pp. 299-304.
M. Metropolis et al., "Equation of State Calculations by Fast Computing Machines", *Journal of Chemical Physics*, Jun. 1953, vol. 21, No. 6, pp. 1087-1092.
J. Jahns et al., "Dammann Gratings for Laser Beam Shaping", *Optical Engineering*, Dec. 1989, vol. 28, No. 12, pp. 1267-1275.
S. J. Walker et al., "Array Generation with Multilevel Phase Gratings", *Optical Society of America*, Aug. 1990, vol. 7, No. 8, pp. 1509-1513.
R. L. Morrison et al., "Binary Phase Gratings Generating Even Numbered Spot Arrays", *Optical Society of America*, 1989 Annual Meeting, Oct. 15-20, 1989, p. 111.

*Primary Examiner*—Bruce Y. Arnold
*Assistant Examiner*—Martin Lerner
*Attorney, Agent, or Firm*—Ross T. Watland

[57] ABSTRACT

A phase diffraction grating apparatus which is usable to generate an array of N spots, where n is an even integer, and the N spots are substantially equally spaced. The generation of an even number of spots is achieved using a translation symmetry in the grating design. Illustratively, the intensities of the N spots are substantially equal. Binary, multi-level, and continuous phase grating embodiments are disclosed. In the case of the multi-level and continuous embodiments, the uniform intensity is obtained using a reflection symmetry in the grating design.

35 Claims, 11 Drawing Sheets

DIFFRACTION GRATING APPARATUS AND METHOD OF FORMING A SURFACE RELIEF PATTERN IN DIFFRACTION GRATING APPARATUS

TECHNICAL FIELD

This invention relates to optics.

BACKGROUND AND PROBLEM

Digital optical systems that employ arrays of optical logical devices require an array of high intensity light beams in order to set and query the logic values of the devices. At the present time, laser diode arrays neither provide the beam quality nor have the appropriate configuration to generate a beam spot array that could adequately operate such an optical system. Binary phase gratings are diffractive optical elements that, in combination with imaging optics, produce a set of spots. These binary phase gratings (BPG), also referred to as Dammann gratings and described in H. Dammann and K. Gortler, "High-Efficiency In-Line Multiple Imaging by Means of Multiple Phase Holograms", Opt. Comm., 3, 312-315 (1971), and H. Dammann and E. Klotz, "Coherent Optical Generation and Inspection of Two-Dimensional Periodic Structures", Optica Acta 24, 505-515 (1977), are usable to produce an array of uniform intensity spots from a single collimated laser beam in the manner disclosed in U. Killat, G. Rabe, and W. Rave, "Binary Phase Gratings for Star Couplers with High Splitting Ratio", Fiber and Integrated Optics 4, 159-167 (1982).

In order for digital optical systems to move from the realm of theory to practical prototype, a number of issues related to spot array generation must be addressed. The issues associated with spot array generation fall primarily into the categories of theoretical design concerns and fabrication methods and tolerances and are summarized as follows: 1) design—matching the spot array with the associated system function and configuration; 2) uniformity—assuring that the relative intensities of the desired spots meet system tolerances; and 3) efficiency—optimizing usage of the illuminating laser beam power.

Design issues have primarily been centered on the ability to calculate solutions for large arrays of spots. Since the number of transitions between the two levels of a binary phase grating for a specific solution is proportional to the number of spots, the complexity of designing a large array escalates quickly. Because of this complexity the optimization programs and associated computational resources can quickly become a severe constraint. However, methods have been demonstrated to overcome this constraint as disclosed in F. B. McCormick, "Generation of Large Spot Arrays from a Single Laser Beam via Multiple Imaging with Binary Phase Gratings", Opt. Eng. 28, 299-304 (1989).

Intensity uniformity is the primary limitation of spot arrays now confronting optical system architects. Spot intensity uniformity is determined by requirements on the operation of the optical logic devices. Critical biasing and/or contrast differences between interconnected logic devices will often dictate these tolerances. Non-uniform intensities are primarily introduced by limitations of the fabrication process and may be impractical to control in many configurations.

Further, the phase grating must be able to maximally utilize the energy of the impinging laser beam by efficiently distributing the light to the desired spots. This is critical since the speed of the system is influenced by the energy available per optical device and economical high power laser sources are not currently available.

The typical binary phase grating of the prior art, referred to herein as the standard grating solution, forms an odd number of spots. An example of a spot array generated by a standard solution is shown in FIG. 1. Note that the spot array of FIG. 1 is a two-dimensional array of 25 spots comprising lines of five spots in one dimension and lines of five spots in a second dimension. More generally, a two-dimensional array of $N \times M$ spots comprises one-dimensional arrays (lines) of N spots in one dimension and one-dimensional arrays (lines) of M spots in a second dimension. The standard spot array design has a high intensity spot central order surrounded by uniform intensity sets of both positive and negative order spots. Symmetries inherent in the BPG design require that each positive and negative order pair have matching intensities. Therefore, only the central order spot can be influenced individually. Elimination of the central order from the standard solution in the manner disclosed in the Killat et al. paper, creates an array with an even number of spots; however the spatial regularity of the array is unfortunately destroyed. This is particularly significant in applications such as the optical crossover network disclosed in the U.S. patent application Ser. No. 07/349,281 of T. J. Cloonan et al. filed on May 8, 1989, allowed on May 20, 1991, now U.S. Pat. No. 5,077,483 issued Dec. 31, 1991 and assigned to the assignee of the present invention, where the use of each device of an array of optical devices is important in achieving the reduced blocking characteristics of the network. The elimination of the central order spot in the Killat arrangement means that the spacing between the two first order spots is twice as large as the spacing between the other spots. Therefore, use of the Killat arrangement in the Cloonan optical crossover network to illuminate arrays of equally spaced optical devices would render the devices corresponding to the suppressed central order unusable.

SOLUTION

This problem is solved and a technical advance is achieved in accordance with the principles of the invention in an exemplary phase diffraction grating apparatus having a surface relief pattern obtained using an optimization method such that the grating is usable to generate an array of N spots, where N is an even integer, and the N spots are, in a departure in the art, substantially equally spaced since all of the even order spots are suppressed in addition to the central order spot. The surface relief pattern includes a plurality of replicated periods; the spot spacing present in the spot array (FIG. 2) produced by an exemplary binary phase grating embodiment of the invention is made to be the same as the spacing of the spot array (FIG. 1) produced by the standard grating solution, by doubling the period within the surface relief pattern and thereby dividing the order spacing of potential spots by two. The generation of an even number of spots is achieved using a translation symmetry in the grating design. Illustratively, the intensities of the N spots are substantially equal. In the case of multi-level and continuous embodiments disclosed herein, the uniform intensity is obtained using a reflection symmetry in the grating design.

A phase diffraction grating in accordance with the invention has a surface relief pattern formed in the grating such that when a monochromatic plane wave of light is transmitted to the grating, light is transmitted from the surface relief pattern to form an array of N spots, where N is an even integer, and the N spots are substantially equally spaced.

Illustratively, the spots are formed by transmitting the plane wave of light through the grating, or alternatively, by reflecting the plane wave of light from the grating. For example, in one optical setup (FIG. 4), a collimated laser beam 41 is directed to a binary phase grating 42 and the diffracted light is focused by a transform lens 43 into a line 44 (one-dimensional array) in an image plane, one focal length away from lens 43. Note that if lens 43 is removed, the line of spots would be formed in the far field. A magnified view of the one dimensional phase grating 42 is shown in FIG. 5.

In a binary phase grating embodiment, the surface relief pattern has two levels and has a set of transitions between the levels, the set including a plurality of periods of length P, where each period has a plurality of transitions between the two levels. When the plane wave of light is of wavelength $\lambda$, and the N spots are formed by passing the transmitted light through an objective lens of focal length f, the substantially equal spacing S of the N spots is given by $$S = 2\frac{\lambda f}{P},$$

or twice the spacing of the standard grating solution. The two levels are separated by a phase depth substantially equal to $\pi$ (or equivalently $3\pi, 5\pi, 7\pi\ldots$). The N spots are formed in a line and, with respect to a plurality of orders spaced apart by a spacing $\frac{1}{2}$ S and comprising a central order and even and odd orders on each side of the central order, the N spots correspond to the odd orders. The transitions in the second half of each period are obtainable by a translation of the first half period transitions and have a phase offset substantially equal to $\pi$ with respect to the first half period transitions.

In a multi-level phase grating embodiment, the surface relief pattern has L levels, L being a positive integer greater than two, and the surface relief pattern has a set of transitions between ones of the levels, the set including a plurality of periods of length P, where each period has a plurality of transitions between ones of the levels. When the plane wave of light is of wavelength $\lambda$, and the N spots are formed by passing the transmitted light through an objective lens of focal length f, the substantially equal spacing S of the N spots is given by $$S = 2\frac{\lambda f}{P},$$

or twice the spacing of the standard grating solution. The levels are separated by a phase depth substantially equal to $$\frac{2\pi}{L} \left( \text{or equivalently } \frac{2\pi}{L} + 2\pi, \frac{2\pi}{L} + 4\pi, \frac{2\pi}{L} + 6\pi\ldots \right).$$

The N spots are formed in a line and, with respect to a plurality of orders spaced apart by a spacing $\frac{1}{2}$ S and comprising a central order and even and odd orders on each side of the central order, the N spots correspond to the odd orders. The transitions in the second half of each period are obtainable by a translation of the first half period transitions and have a phase offset substantially equal to $\pi$ with respect to the first half period transitions. The transitions in the second quarter of each period are obtainable by reflection of the first quarter period transitions about a midpoint of the first half period.

In a continuous grating embodiment, the surface relief pattern comprises a continuous surface comprising a plurality of periods of length P. When the plane wave of light is of wavelength $\lambda$, and the N spots are formed by passing the transmitted light through an objective lens of focal length f, the substantially equal spacing S of the N spots is given by $$S = 2\frac{\lambda f}{P},$$

or twice the spacing of the standard grating solution. The N spots are formed in a line and, with respect to a plurality of orders spaced apart by a spacing $\frac{1}{2}$ S and comprising a central order and even and odd orders on each side of the central order, the N spots correspond to the odd orders. The transitions in the second half of each period are obtainable by a translation of the first half period transitions and have a phase offset substantially equal to $\pi$ with respect to the first half period transitions. The transitions in the second quarter of each period are obtainable by reflection of the first quarter period transitions about a midpoint of the first half period.

Optical spot-generating apparatus in accordance with the invention comprises a source of a monochromatic plane wave of light of wavelength $\lambda$, an objective lens of focal length f, and a phase diffraction grating. The grating is responsive to the plane wave of light and has a surface relief pattern comprising a plurality of periods of length P for transmitting light from the surface relief pattern through the lens to form an array of N spots, where N is an even integer. The N spots are substantially equally spaced at a spacing S given by $$S = 2\frac{\lambda f}{P}.$$

An optical system in accordance with the invention has a plurality of stages, with each stage comprising a source of a monochromatic plane wave of light, a phase diffraction grating, and an array of N×M optical devices, where N and M are even integers. The phase diffraction grating has a surface relief pattern formed in the grating. The grating is responsive to the plane wave of light for transmitting light from the surface relief pattern to form an array of N×M spots. The N spots are substantially equally spaced, and the M spots are substantially equally spaced. The array of N×M devices is responsive to the array of N×M spots.

A method in accordance with the invention is used for forming a surface relief pattern in a phase diffraction grating such that when a monochromatic plane wave of light is transmitted to the grating, light is transmitted from the surface relief pattern to form an array of N spots, where N is an even integer, and the N spots are substantially equally spaced. First half periods are formed for a plurality of periods of length P which comprise the surface relief pattern. Second half periods are formed for the plurality of periods, where the second half periods are obtained by a translation of the first half periods and having a phase offset substantially equal to $\pi$ with respect to the first half periods.

DRAWING DESCRIPTION

FIG. 1 is a diagram of a two-dimensional array of 25 spots produced by a diffraction phase grating of the prior art, referred to herein as the standard grating solution, comprising one-dimensional arrays (lines) of five spots (an odd number) in one dimension and one-dimensional arrays (lines) of five spots (an odd number) in a second dimension;

FIG. 2 is a diagram of a two-dimensional array of 16 spots produced by a diffraction phase grating in accordance with an embodiment of the present invention, comprising one-dimensional arrays (lines) of four spots (an even number) in one dimension and one-dimensional arrays (lines) of four spots (an even number) in a second dimension, and illustrating that with respect to a plurality of orders spaced apart by one-half the spot spacing of FIG. 1 and comprising a central order and even and odd orders on each side of the central order, the four spots of each dimension correspond to the odd orders;

Figure 16:
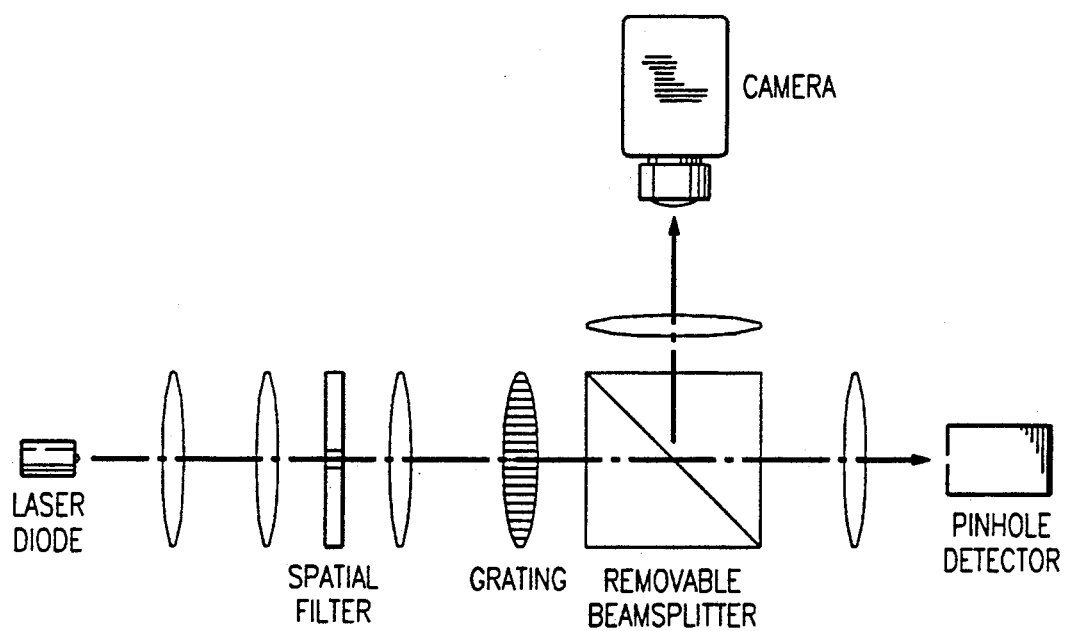
Figure 17:
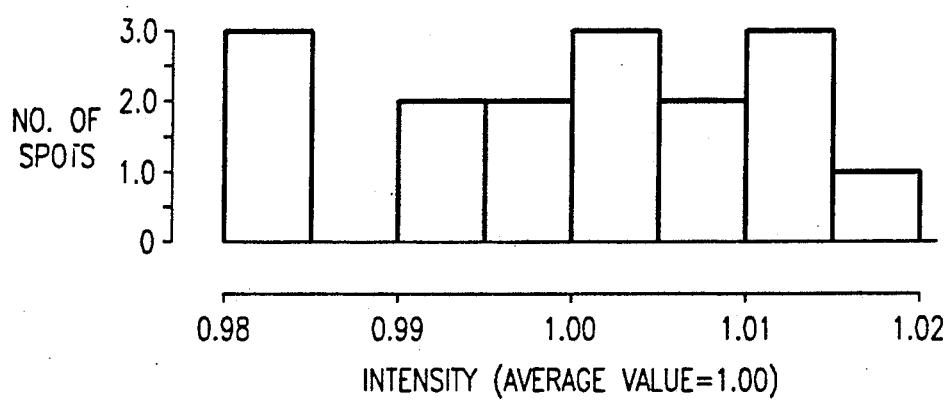
Figure 18:
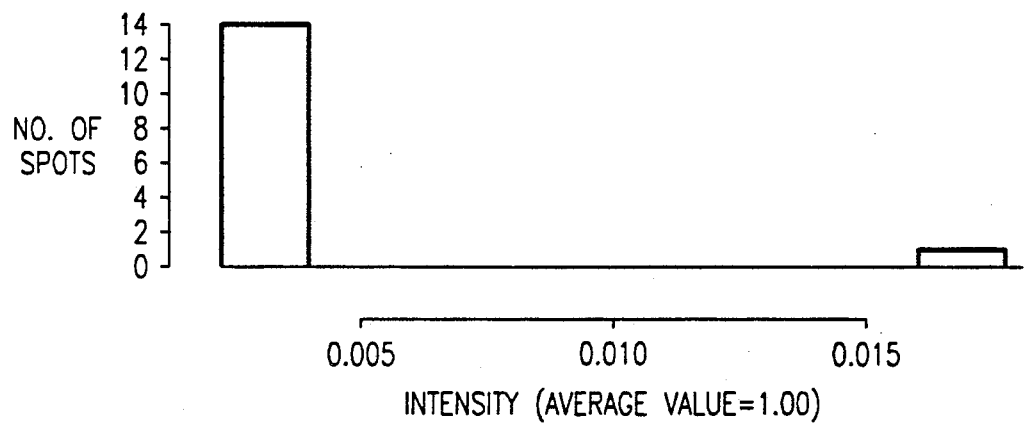
Figure 19:
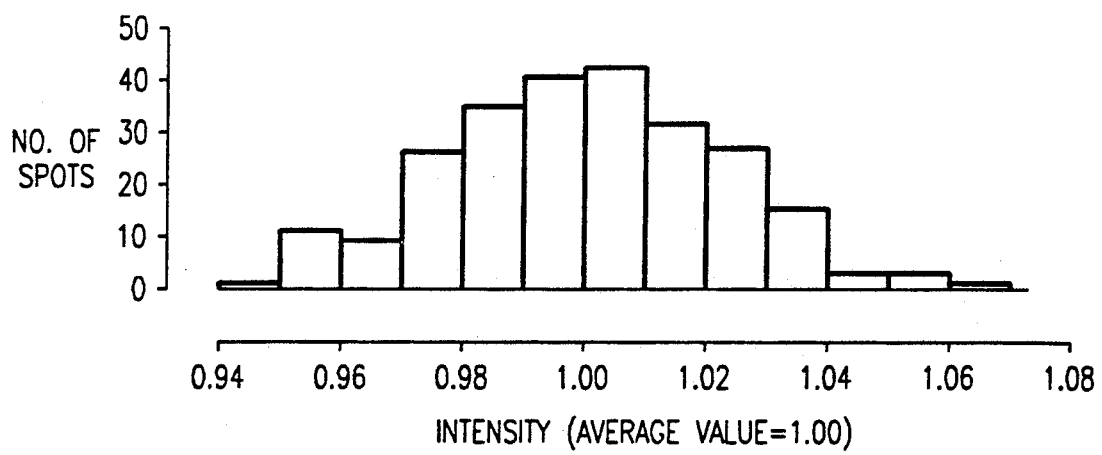
Figure 20:
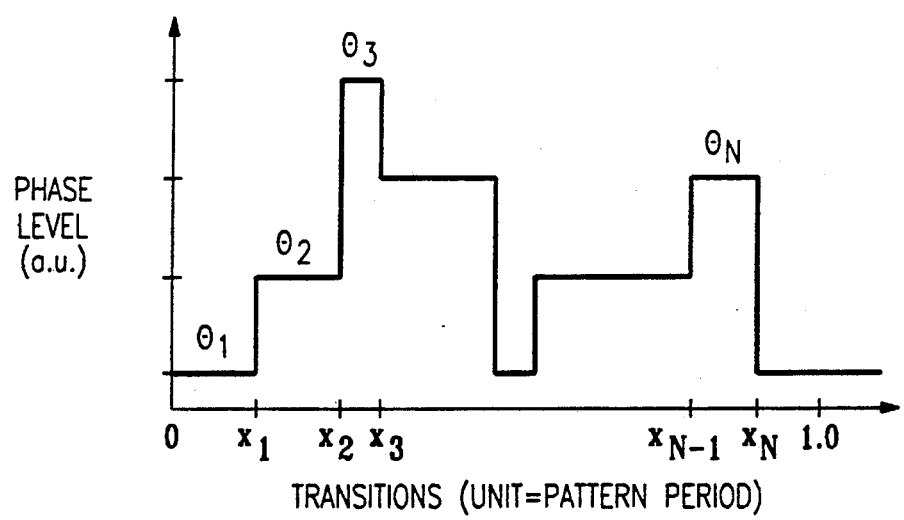
Figure 21:
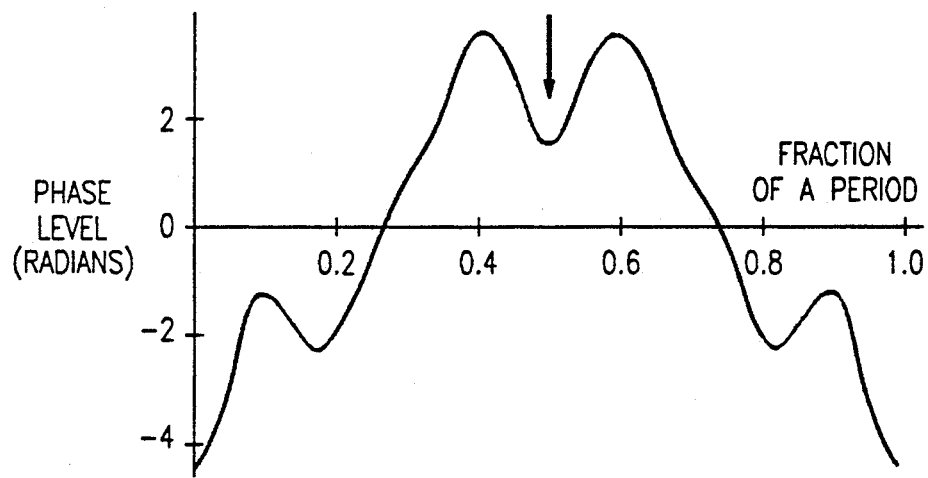
Figure 22:
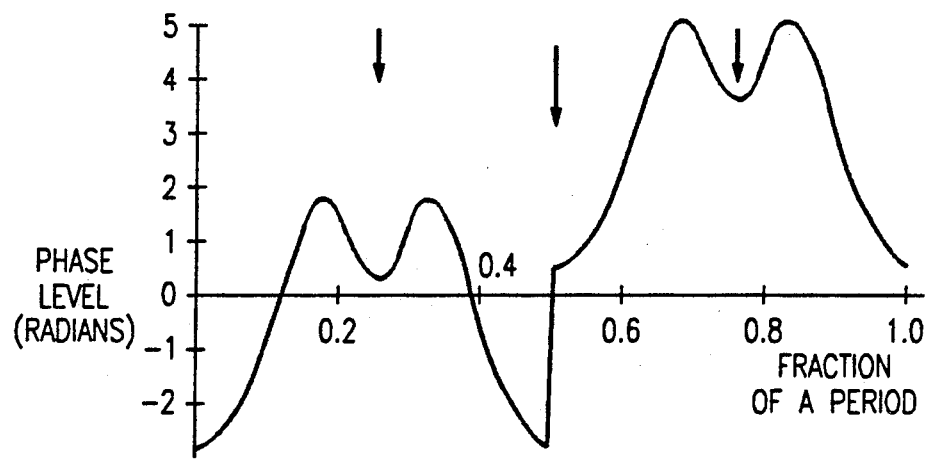
Figure 23:
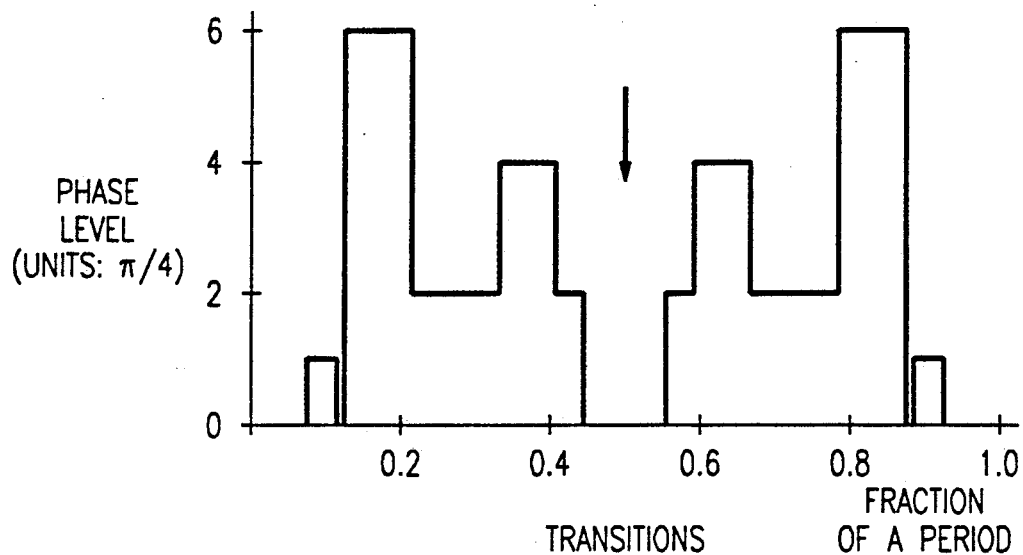
Figure 24:
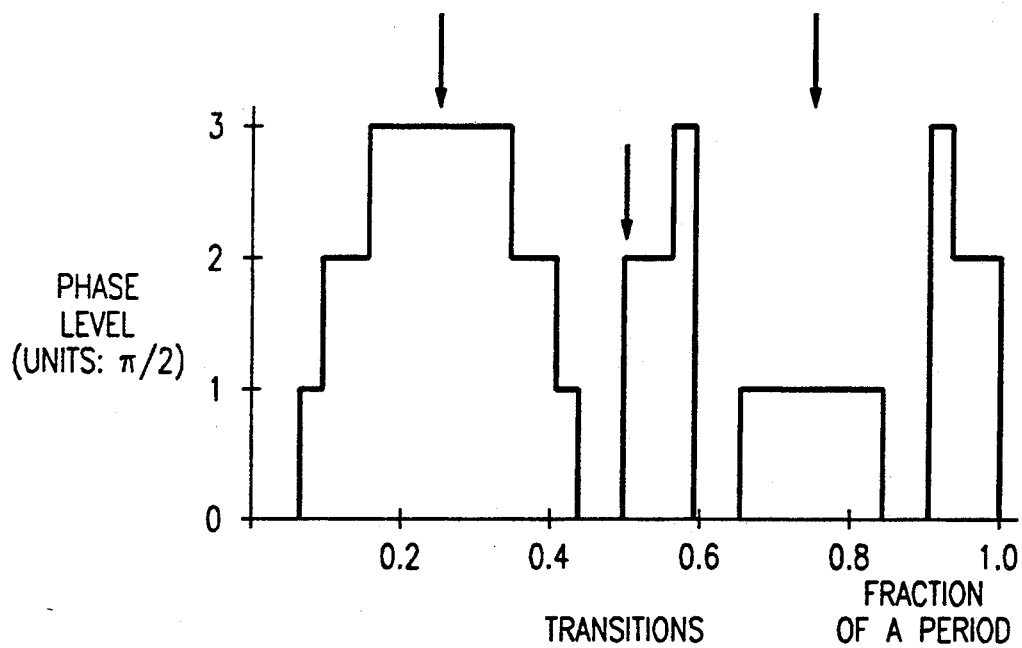
Figure 25:
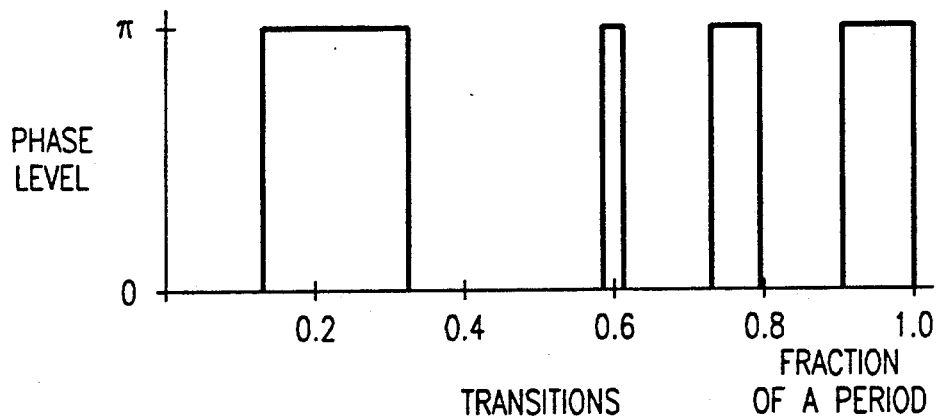
Figure 26:
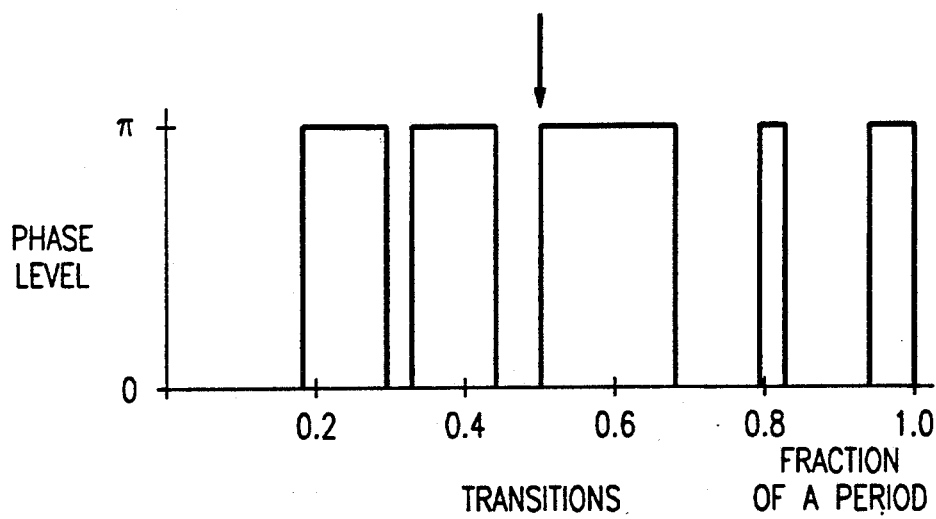
Figure 27:
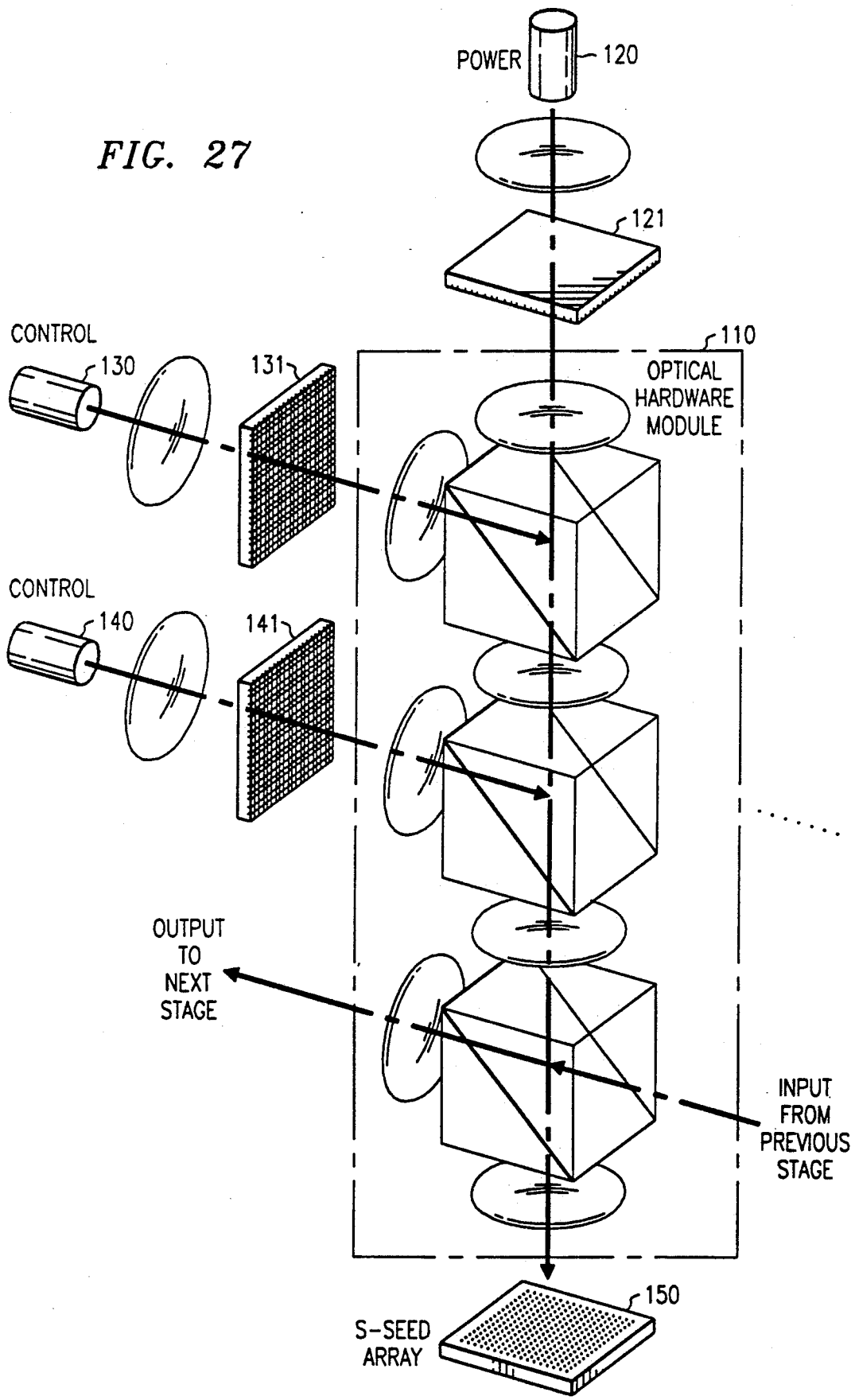

FIGS. 8–11 show three periods of the surface relief pattern used to produce gratings for $1 \times 4$, $1 \times 6$, $1 \times 8$, and $1 \times 16$ spot arrays, respectively;

FIGS. 12–15 illustrate the basic procedure for producing the binary phase grating structure via reactive ion etching;

FIG. 16 is a schematic of an optical setup used to measure the intensity of each spot in an spot array and thereby determine the uniformity and generation efficiency;

FIGS. 17–18 present measurements for a grating producing a $1 \times 16$ spot array;

FIG. 19 present measurements for an arrangement where two $1 \times 16$ gratings are cascaded with their patterns oriented orthogonally to form a $16 \times 16$ spot array;

FIG. 20 is a diagram of the coordinate system used to describe and analyze the properties of a multi-level phase grating embodiment;

FIG. 21 illustrates a reflection symmetry used in a continuous phase grating embodiment where the midpoint of the period is used as the reflection point and zero phase offset is used;

FIG. 22 illustrates a translation symmetry used in a continuous phase grating embodiment where the center arrow denotes the point about which the translation symmetry is maintained and the other two arrows mark the points of reflection symmetry of the smaller half periods;

FIG. 23 is a phase plot for one period of a discrete multi-level phase grating embodiment with reflection symmetry about the period midpoint;

FIG. 24 is a phase plot for one period for an even-number spot array phase grating embodiment with a multi-level phase grating pattern having translation symmetry about the midpoint, 0.5, and reflection symmetry about the quarter points, 0.25, 0.75—the four-level pattern is used to produce a one-dimensional array (line) of eight spots;

FIG. 25 show a binary level pattern that produces a one-dimensional array (line) of 13 spots;

FIG. 26 shows a binary level pattern that produces a one-dimensional array (line) of eight spots with 75.9% of the energy distributed to the desired orders; and FIG. 27 is a diagram of an optical system employing two-dimensional binary phase grating embodiments of the present invention.

DETAILED DESCRIPTION

Figure 2:
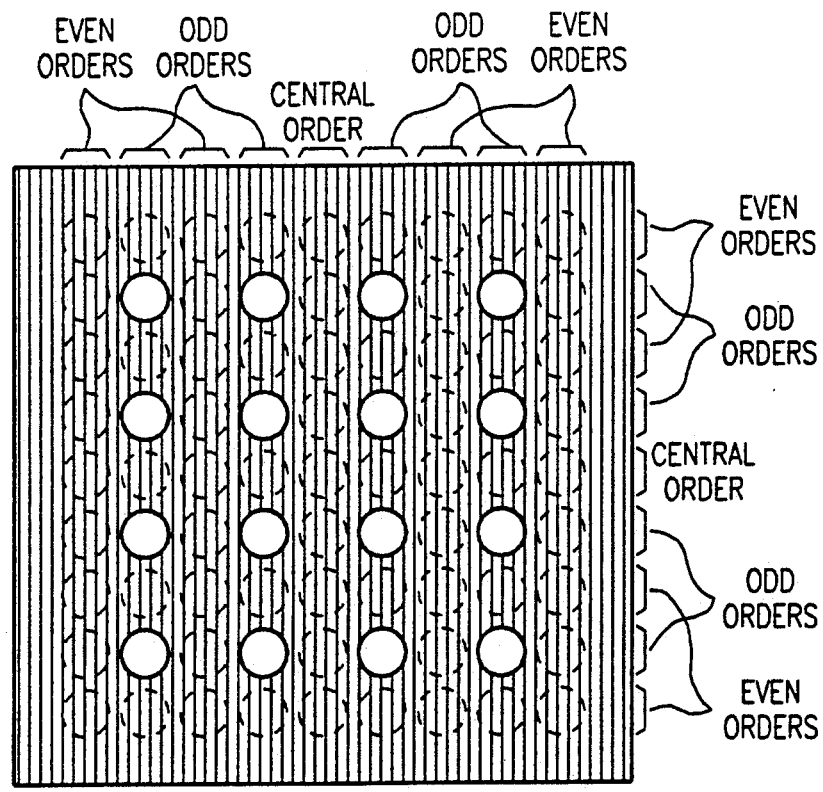

FIG. 2 is a diagram of a two-dimensional array of 16 spots produced by a diffraction phase grating in accordance with an embodiment of the present invention.

Figure 1:
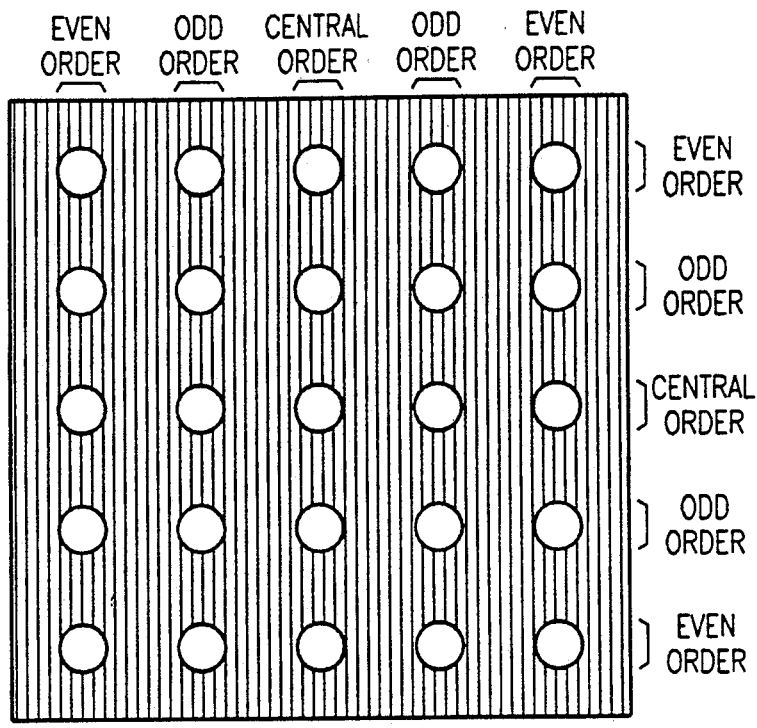

The exemplary grating design producing even numbered spot arrays can be compared with the standard design FIG. 1. The exemplary grating design for even number spot arrays preserves spot regularity while creating other advantages preferable in digital optical system applications. For the case of the even number spot array, all even order spots are suppressed as shown in FIG. 2. It is this suppression of every other spot in the one dimensional array that leads to a regular array.

Figure 3:
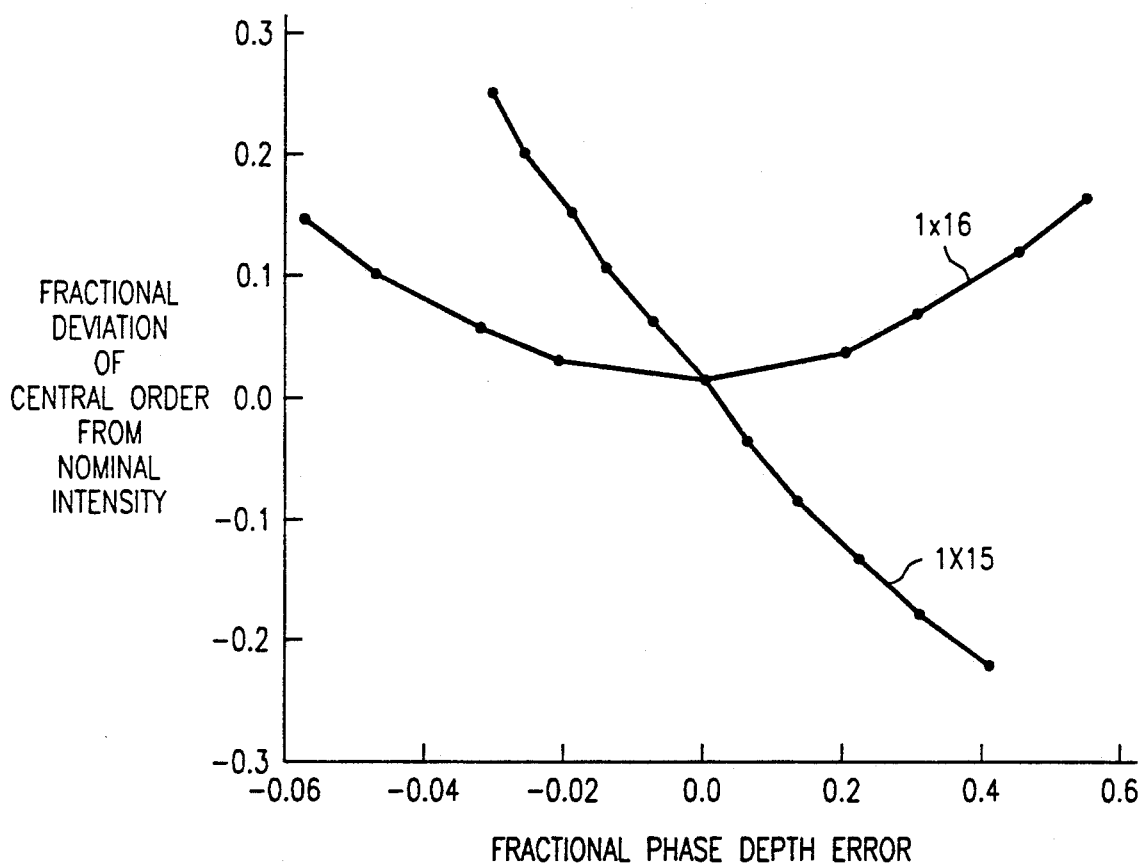
FIG. 3 is a plot of the central order intensity for both a standard and an even numbered spot array.

The functional dependence of the central or zero order intensity differs radically from that of the other orders and is the primary contributor to non-uniformity problems. It is thus very advantageous to eliminate the zero order spot from the spot array design. Indeed, the zero order intensity is so highly sensitive to the optical path difference (also referred to as the phase depth or phase difference) between levels that it is unlikely that larger arrays will be economically fabricated since substrates with a sufficient surface quality will be unduly expensive. This situation is illustrated in FIG. 3 where the deviation of the central order intensity is plotted for both a standard and even numbered spot array. Both arrays contain a similar number of spots, yet the phase depth sensitivity for the standard solution is considerably greater than that of the new design. As the number of spots increases, the sensitivity becomes even more severe. For example, the fabrication of a $1 \times 45$ diffraction grating with a maximum 10% intensity deviation would require that the fabrication error be no larger than about 1/20 of a wavelength.

The advantages of the even numbered arrays are considerable. First, the system designer is no longer hampered by the sensitivity of the central order intensity to phase depth error. The central order intensity will be small and, if the system contains an intermediate focus, can easily be masked and eliminated. Second, systems based on regular square arrays of devices containing on the order of $2^n$ logic devices will be most suitable for prototype systems. Thus the even numbered design can be used to precisely match spot arrays with these device arrays. Lastly, since the optical path difference of the one dimensional even numbered grating is a phase difference of $\pi$ (or equivalently $3\pi$, $5\pi$, $7\pi$ . . . ), it is simple to combine two one-dimensional solutions to obtain a two dimensional array and still conform to a two level phase design.

Figure 4:
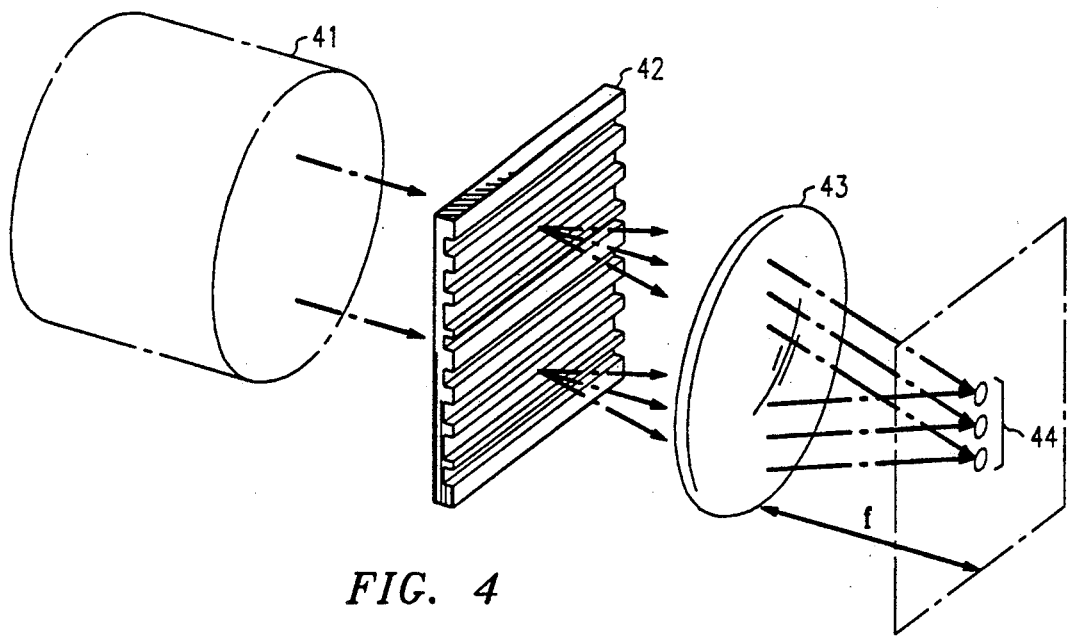
FIG. 4 is a diagram of an optical Fourier transform setup including a one-dimensional binary phase grating embodiment of the present invention.
Figure 5:
FIG. 5 is a magnified view of the one-dimensional binary phase grating embodiment of FIG. 4.

The production of spot arrays from diffraction gratings is performed in an optical Fourier transform setup (FIG. 4) where a collimated laser beam 41 is directed to a binary phase grating 42 and the diffracted light is focused by a transform lens 43 into a line 44 (one-dimensional array) in an image plane, one focal length away from lens 43. Note that if lens 43 is removed, the line of spots would be formed in the far field. A magnified view of the one dimensional phase gratings 42 is shown in FIG. 5. The condition under which it is assumed that the output spot array is described by the Fourier transform of the light that passes through the phase grating, is referred to as the Fraunhofer assumption (see for instance the book Introduction to Fourier Optics by John Goodman, McGraw-Hill Book Company, 1968, p.61, equation (4–12)). Given a incident plane wave of maximum radius, R, and wavelength, $\lambda$, the image is formed in the far field at a distance z described by $$z >> \frac{\pi R^2}{\lambda}.$$

However the patterns can be observed at distances closer than that implied by the equation. In general, it is the property of a converging lens to perform a two-dimensional Fourier transformation. Several periods of a one or two dimensional replicated pattern are illuminated by a collimated laser source. The staggered surface levels of the grating introduce a phase difference between light transmitted through the various regions resulting in interference in the far field of the optical system. The distribution of the light intensity in the resulting spot array is a combination of both the Fourier transform of the source distribution and the Fourier transform of the grating topology. Neglecting the contribution from the source beam distribution, the output consists of a series of spots (due to the periodic nature of the pattern) where each order intensity is provided by the Fourier transform of one complete period of the grating pattern.

Since the spot arrays of the present embodiments are either square or rectangular, the two-dimensional structure is separated and each one-dimensional solution is individually obtained. The amplitude for a specific order of a one-dimensional grating is expressed by the equation:

$$A(n) = \int_0^1 \exp(-2\pi i n x)\exp(i\theta(x))dx, \quad [1]$$

where n designates the order of spot, $\theta(x)$ is the function describing the phase relief of the one dimensional diffraction grating surface, and the coordinate system has been normalized so that a single period of size P is the unit length. Since the intensity of the spot is the complex square of the amplitude, only relative coordinate and phase shift differences need to be considered, i.e., the solution is shift invariant with respect to an arbitrary coordinate and phase offset. The spots generated by the array in the image plane are separated by a distance $$S = \frac{\lambda f}{P}, \quad [2]$$

where S is the spot spacing, f is the focal length of the Fourier transform lens, P is the period of the grating pattern, and $\lambda$ is the wavelength of the illuminating laser beam. In the case of the even numbered arrays every other order is suppressed; therefore, the distance between high intensity spots is twice that given by equation [2] or $$S = 2\frac{\lambda f}{P}. \quad [3]$$

Figure 6:
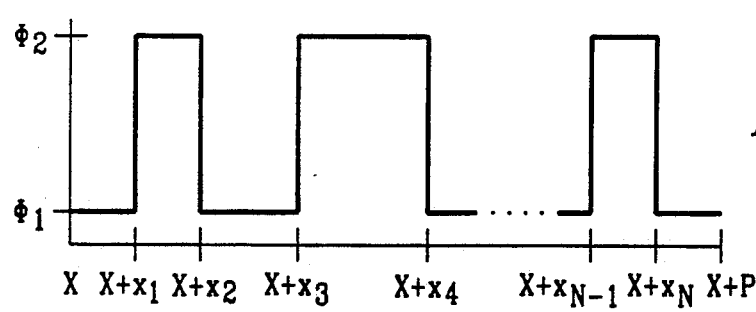
FIG. 6 is a diagram of the coordinate system used to describe and analyze the properties of a binary phase grating.

The grating consists of a series of repeated patterns fabricated on an optically transparent substrate. The coordinate system used to describe the grating structure is shown in FIG. 6. The location of the transitions are given by $x_k$ where $x_k$, ($1 < k < N$) is the position of a transition within the range $0 \leq x_k \leq 1$ and N is the total number of transitions with N being an even number. The term $\theta_k$ represents the relative phase shift experienced by the light in the region between $x_{k-1}$ and $x_k$. The case of the two level or binary phase grating is limited to two phase levels where $\Delta\theta$ is the magnitude of the phase difference. The amplitude relationship is formulated by solving equation [1] using the configuration shown in FIG. 6. The solution consists of two equations:

$$A(n) = -\frac{1}{2\pi i n}\sum_{k=1}^{N}[\exp(i\theta_k) - \exp(i\theta_{k+1})]\exp(-2\pi i n x_k), \quad [4]$$

whereas the central order term (n=0) is given by:

$$A(0) = \exp(i\theta_N) + \sum_{k=1}^{N} x_k[\exp(i\theta_k) - \exp(i\theta_{k+1})]. \quad [5]$$

These last two equations are adequate to specify the operation of both the standard and even numbered spot array gratings.

It is expected that the number of transitions necessary to produce a given array is proportional to the number of restrictions applied to the given orders. At first glance this would appear to favor the design of the standard spot array grating since it is only necessary to restrict the N central uniform intensity spots, while the even numbered design must regulate both the N high intensity spots and suppress the N−1 intermediate spots. Fortunately, the application of a translational symmetry reduces the number of independent transitions to a number consistent with the standard design.

Figure 7:
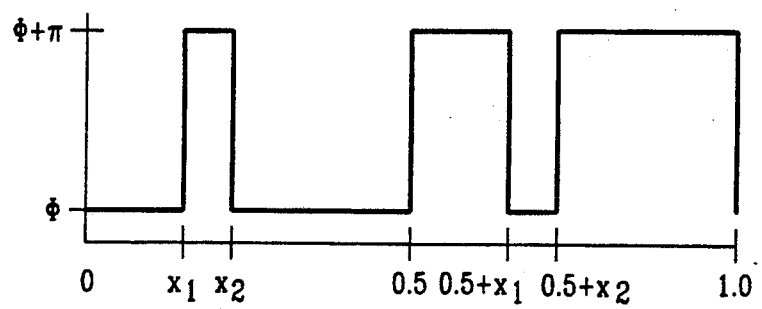
FIG. 7 is a diagram illustrating the translation symmetry condition imposed on the binary phase grating design leading to the suppression of all even order spots and the phase depth condition imposed on the design to suppress the central order spot.
Figure 8:
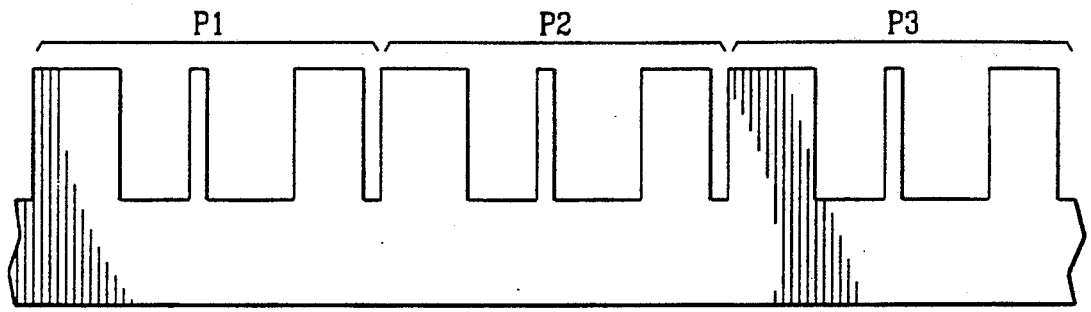
Figure 9:
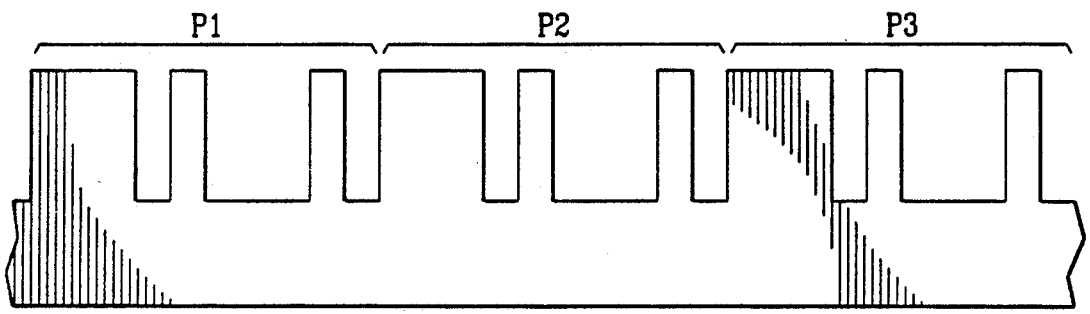
Figure 10:
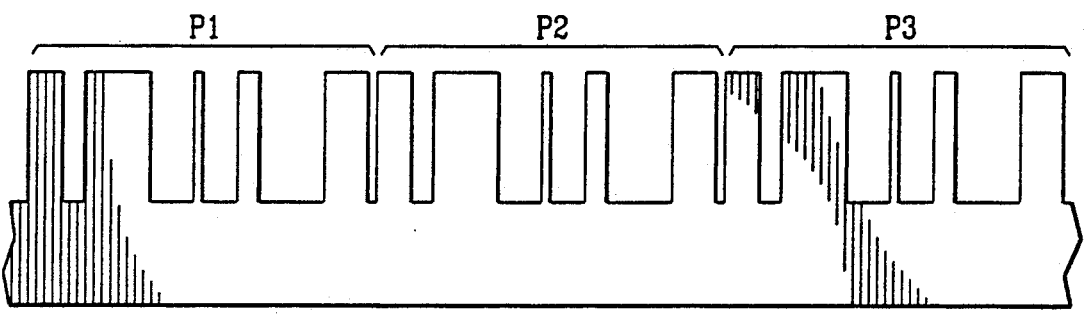
Figure 11:
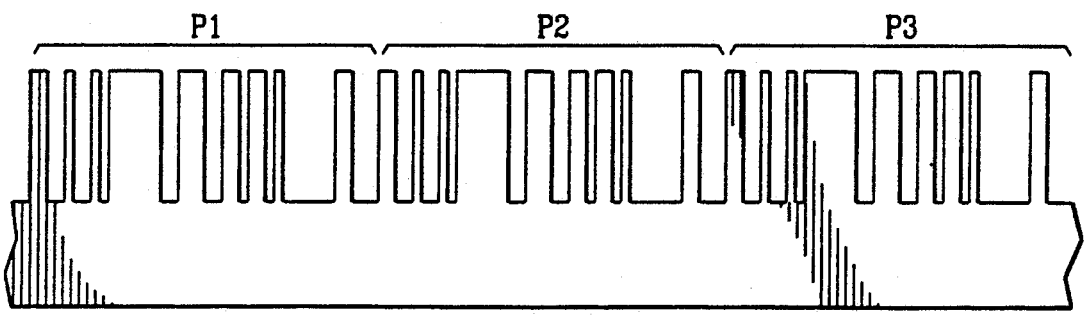

The symmetry condition that is imposed on the even numbered spot array solution leads to the suppression of all even order spot intensities. In addition, if a phase depth of $\pi$ is specified, the central order intensity also becomes zero. The symmetry is illustrated in FIG. 7. All transitions in the first half of the period are reproduced in the second half of the period by translating the coordinate by one half period. Next, the phase value of the corresponding region in the second half of the period is set to the opposite value of that in the first region. This is equivalent to adding a value of $\pi$ to the phase value and then reducing it modulus $2\pi$. More formally, $$X_k = X_{k-N/2} + 0.5, \text{ for } N/2+1 \leq k \leq N \quad [6]$$

$$\theta_k = \theta_{k-N/2} + \pi. \quad [7]$$

It can be shown that the outcome of this symmetry is the solution:

$$A(n) = \frac{-2}{\pi n} \sum_{k=1}^{N/2} (-1)^k \exp(-2\pi i n x_k), \text{ for } n \text{ odd, and} \quad [8]$$

$$A(n) = 0, \text{ for } n \text{ even}.$$

In addition, the choice of $\pi$ as the phase difference, $\Delta\theta$, leads to $A(0)=0$.

To summarize, a translational symmetry is utilized to naturally suppress the undesired orders and to reduce the number of independent transitions necessary to describe the grating structure. Due to this symmetry, the complexity of locating a set of transitions for an even numbered design is similar to that for a comparable size standard array. Unfortunately, in spite of the inherent symmetry, the design does require about twice the number of transitions that are required by a standard grating. This additional complexity is diminished, though, by the use of a period length that is twice that of the conventional design to form high intensity spots with the same spacing. Finally, by judiciously choosing the separation of the two levels to be equal to a phase difference of $\pi$, the central order spot intensity is eliminated and a solution is obtained that is easily implemented as a two-level, two-dimensional spot array.

Although equation [8] specifies the amplitude and hence the intensity at each order, it is the task of the gratings designer to locate the set of transitions that adequately satisfy the criteria for the spot array intensity distribution, nominally a uniform intensity spot array of a specific size. These criteria include the overall efficiency for diffracting the impinging beam into the set of desired orders, henceforth referred to as $\eta$, and the standard deviation of the desired order intensities from a nominal value, $\sigma$. A cost or merit function is constructed that maximizes the efficiency and minimizes the intensity deviation. The cost function, $C$, which is a function of the transition and phase coordinates sets, was chosen to be $$C(x,\theta) = \frac{\sigma^2}{\eta}, \quad [9]$$

where $\eta$, the diffraction efficiency, and $\sigma^2$, which measures the intensity nonuniformity, are defined as $$\eta = \sum_{n=-M}^{+M} I(n), \text{ and} \quad [10]$$

$$\sigma^2 = \sum_{n=-M}^{+M} (I(n) - I_{av})^2. \quad [11]$$

In these formulae, M is the extreme order and I(n) is the order intensity given by:

$$I(n) = A(n)^2 \quad [12]$$

where $A(n)$ is the amplitude given by equation [8].

Potential solutions were identified in the following manner. First, a random set of transitions were generated and the efficiency and intensity deviation were compared against an initial set of criteria. If the solution failed to meet a specified criteria, it was discarded and a new random solution was generated. A successful solution is passed to the simulated annealing routines.

The simulated annealing algorithm as disclosed in N. Metropolis, A. W. Rosenbluth, M. N. Rosenbluth, A. H. Teller, and E. Teller, "Equation of State Calculations by Fast Computing Machines", J. Chem. Phys. 21, p. 1087-1092 (1953) provides a means of locating a global minimum in the merit function. It avoids the pitfall of becoming trapped in local minima as can often occur in a simple gradient descent algorithm. Starting with the initial transition set, a series of new transitions located in the vicinity are sampled. If the new solution's cost is lower than that of the current test solution, then it is selected to become the current optimal solution. However if the cost value is greater than that of the current solution, a decision is made based on the following criteria. A random number generated over the range 0 to 1 is compared against a probability given by $$P(n) = \exp\left[-\frac{C(x',\theta') - C(x,\theta)}{T}\right] \quad [13]$$

where the prime denotes the test solution and T is a slowly decreasing parameter. If the random number exceeds the probability, then the new transition set is retained. Otherwise, the solution is discarded. Initially the value of T is set at a moderate value so that shallow local minima do not bind a particular solution. Over the course of the simulated annealing, the value of T is gradually decreased and the search region is narrowed so that the solution eventually locates a minimum.

The simulated annealing is performed in a series of steps. At the end of each step the solution must meet threshold values on the cost, efficiency and intensity deviation. Whenever a solution fails to meet the criteria the program generates a new random solution and begins the simulated annealing again. Usually the final conditions require the potential solution to have an efficiency greater than 70-75% and an intensity deviation of approximately 5%.

If these conditions are satisfied a gradient descent algorithm is used to locate the nearest minimum. The gradient search uses an approximation to the first and second derivative in a second order Taylor series expansion to predict the coordinates of the minimum. This process typically requires only a few steps. If the final solution set meets the overall requirements (typically 75-80% efficiency and less than 1% intensity deviation) the transitions set is retained.

The optimization program proceeds until several solutions are collected for a specific array of spots. Many unique solutions are often located for the larger spot arrays. Ultimately the optimal solution depends on factors beyond the efficiency and intensity uniformity criteria. For example, the tolerances of the fabrication process often dictate the minimum size of a feature and the degree of quantization of the pattern.

Collected in Table 1 are solutions for the $1\times4$, $1\times8$, $1\times16$ and $1\times32$ binary phase gratings together with the theoretical efficiency. Each solution has two phase levels which differ by $\pi$ radians. FIGS. 8-11 show three periods of the amplitude pattern that would be used to produce gratings for $1\times4$, $1\times6$, $1\times8$, and $1\times16$ spot arrays, respectively. The translational symmetry between the first and second half of the period is clearly visible in FIGS. 8-11. These theoretical solutions are used in the fabrication and characterization of the diffraction gratings.

TABLE 1

| Solution Efficiency | Transitions in first half of period of even number spot array designs | | | | |
|---|---|---|---|---|---|
| | 1 × 4  0.705 | 1 × 6  0.845 | 1 × 8  0.761 | 1 × 16  0.805 | 1 × 32  0.837 |
| 1 | 0.0000 | 0.0000 | 0.0000 | 0.0000 | 0.0000 |
| 2 | 0.2171 | 0.2910 | 0.0617 | 0.0610 | 0.0746 |
| 3 | 0.2716 | 0.3855 | 0.2436 | 0.1152 | 0.1515 |
| 4 | 0.5000 | 0.5000 | 0.3537 | 0.2775 | 0.1714 |
| 5 | | | 0.3858 | 0.3141 | 0.2002 |
| 6 | | 0.5000 | 0.5000 | 0.3456 | 0.2066 |
| 7 | | | | 0.3925 | 0.2406 |
| 8 | | | | 0.4260 | 0.2637 |
| 9 | | | | 0.4426 | 0.3019 |
| 10 | | | | 0.5000 | 0.3308 |
| 11 | | | | | 0.3701 |
| 12 | | | | | 0.3907 |
| 13 | | | | | 0.4068 |
| 14 | | | | | 0.4254 |
| 15 | | | | | 0.4441 |
| 16 | | | | | 0.4612 |
| 17 | | | | | 0.4810 |
| 18 | | | | | 0.5000 |

Figure 12:
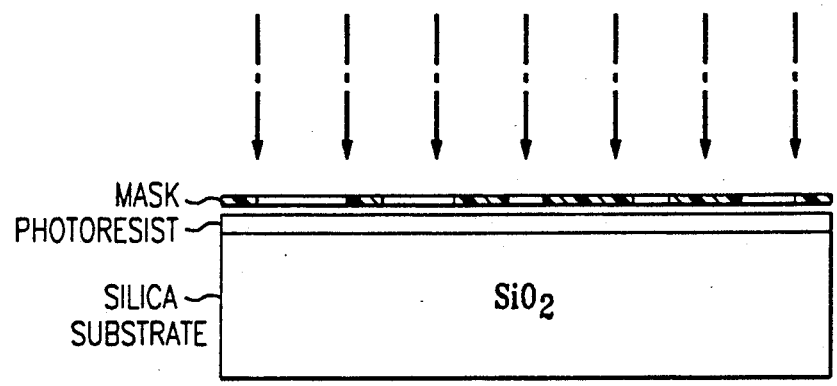
Figure 13:
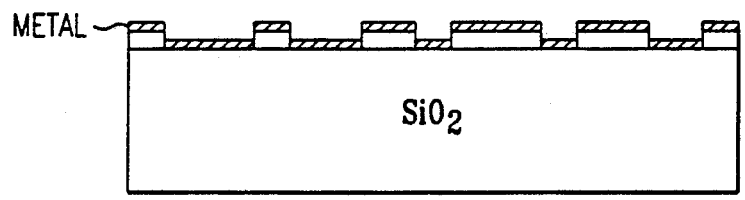

The fabrication procedure for creating the even numbered binary phase gratings uses many of the techniques commonly used in semiconductor processing technology. FIGS. 12-15 illustrate the basic procedure for producing the binary phase structure via reactive ion etching. Starting with an optically transparent substrate such as a flat fused silica disc that has been thoroughly cleaned to remove all residue, a thin layer of photoresist (about 1 micron thick) is applied on one side of the disc. Next, the coated disc is placed in contact with an amplitude mask, produced by e-beam or optical lithography, which holds the theoretical pattern. While the two are in contact, they are exposed with a UV light source to transfer the pattern into the photoresist (FIG. 12). The optical substrate is then immersed in photoresist developer to remove the soluble regions of the exposed thin film. The substrate is next placed into an evaporation system where a thin layer of chromium metal is deposited. After metal deposition, a liftoff process is used to remove areas with metal-coated photoresist (FIG. 13).

Figure 14:
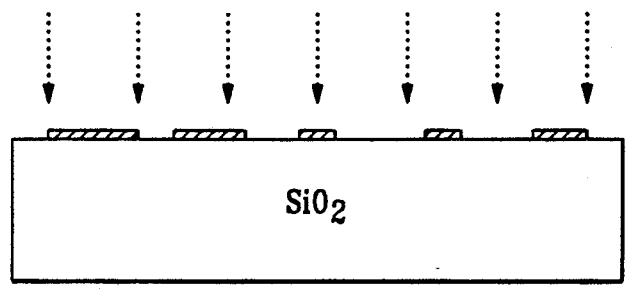
Figure 15:
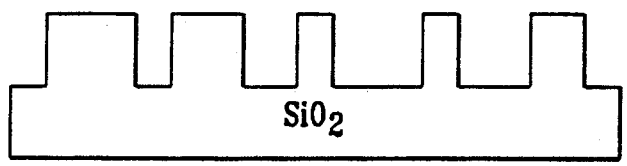

Finally the optical path difference is created in the surface by reactive-ion etching of the exposed material (FIG. 14). The etch depth, h, is related to the phase depth by the relationship $$h = \frac{\lambda \Delta \theta}{2\pi \Delta n},  \quad [14]$$

where $\Delta \theta$ is the phase depth, $\Delta n$ is the difference between the index of refraction of the substrate and air, and $\lambda$ is the wavelength of the illuminating laser. For even numbered gratings a phase depth of $\pi$ is desired. When fused silica is used as a substrate and an 850 nm laser is used for illumination, the pattern is etched to a depth of about 940 nm with a precision of about ½ to 1%. Prior to use, the remaining metal is removed and the surface cleaned leaving a completely transparent phase diffraction grating (FIG. 15).

One important procedure used in the production of the etch mask is the utilization of a compensation procedure to precisely control the transition location. Due to the finite thickness of the photoresist and the diffraction of light at the edge of a mask feature, some of the photoresist that should nominally be shadowed is exposed. Although the amount is small, its effect on the intensity uniformity can be substantial for gratings patterns with relatively small pitch or high complexity. It has been found that decreasing the lateral space between opaque mask regions by 0.7 microns allows transitions to be obtained that are consistent with design criteria.

Currently, the primary criteria for evaluating BPG performance in proposed optical systems is the uniformity of the spot array intensity. The uniformity determines, for example, how effectively the limited operating range of the logic device in a cascaded system can be exploited. Efficiency is also a concern; however, multi-level phase gratings are usable to improve efficiency.

A computerized data acquisition system was used to measure the intensity of each spot in the spot array and thereby determine the uniformity and spot array generation efficiency. A schematic of this setup is shown in FIG. 16. The binary phase grating was illuminated by a collimated light beam emanating from an infrared laser diode operating at a power of about 3 mW at a wavelength of 850 nm. This beam was spatially filtered by a 30 micron pinhole to improve the beam characteristics. The beam spot at the grating was typically 7 mm by 10 mm. Next, the diffracted beam was focused via a 100 mm objective lens onto a pinhole aperture. The pinhole was mounted directly to an HP81520A/HP8152A optical power meter that was connected to a GPIB data acquisition bus. The 50 micron pinhole and detector was translated between spots using a computer controlled 3 axis stage. The entire spot intensity measurement process was controlled by a SUN3/160 workstation. In addition, the system contained a removable beam splitter to allow inspection of the spot array when necessary. Since the gratings were fabricated according to specifications for a separate optical experiment, there was no attempt to tune the laser diode wavelength to optimize the central order performance.

Several 1×4, 1×6, 1×8, 1×16, and 1×32 phase gratings have been fabricated and their performance characterized. Although the results presented within this paper are exclusively from gratings with a 1000 micron period, several other gratings with periods as small as 331 microns have also been fabricated.

FIGS. 17-18 present measurements for a grating producing a 1×16 spot array. The histograms of FIGS. 17 and 18 show the desired and suppressed intensity distribution, respectively, relative to the average intensity of the desired orders. The desired order intensities of the one dimensional 16 spot array (FIG. 17) all lie within +/−2% of the intensity average, while the majority of the suppressed orders (FIG. 18) are less than 0.5% of the average intensity. As expected the suppressed central order spot exhibits the largest deviation having an intensity of 1.7% of the average intensity corresponding to a etch depth error of about 17 nm.

FIG. 19 shows the performance when two 1×16 gratings are cascaded with their patterns oriented orthogonally to form a 16×16 spot array. All 256 spots are contained in a region spanning 6% on either side of the average intensity value and the standard deviation of the intensities is 4.0%. It was found that the measured efficiency of the diffraction gratings was consistent with the theoretical value when losses due to surface reflection were taken into account. It is expected that most of these reflection losses could be eliminated if anti-reflection coatings were applied to the surfaces.

The demonstrated performance of two dimensional structures have also shown exceptional performance. Several 8×8 BPGs with a 662 micron period in each dimension have been fabricated and measured to have an intensity standard deviation of from 1.4% to 1.8%. In fact, with current fabrication technologies, moderately large spot arrays (up to 16×16) with periods on the order of 500 microns can be fabricated with spot intensities limited to a spread of less than 10%.

Dammann gratings as disclosed in the above-referenced Dammann et al. articles are diffraction gratings that produce replicated images or arrays of spots from an incoming beam of monochromatic light. This property makes them useful for image duplication applications and spot array generation in optical computing. The process of designing an appropriate grating pattern typically involves an optimization procedure, therefore, the primary limitation in designing gratings that produce complex arrays is the computational resources required. In this description the incorporation of symmetries into the pattern is exploited to significantly reduce the complexity associated with the design process.

Diffraction gratings that are used in optical computing applications are designed to create a finite set of uniform intensity images whose separation is inversely proportional to the size of the pattern's period. FIG. 4 illustrates the optical setup that achieves this result. The intensity distribution in the output array is determined by the structure of one period of the grating and is related to the Fourier transform of this period. Since the application requires the efficient use of the available light, diffraction is chosen to occur from the interference of the light passing through separate regions having differing optical path lengths, i.e., a phase grating. Due to the nature of the fabrication process, these diffraction gratings are designed as a set of discrete phase levels associated with regions of various sizes (see for example FIG. 20). Most of the current work has centered on the two level or binary phase grating where the solution can be described by the set of transition points alone. In order to improve operating characteristics of the gratings, however, multilevel designs are also under examination as disclosed in S. J. Walker, J. Jahns, "Array Generation With Multilevel Phase Gratings," OSA Annual Meeting, 1988 Technical Digest Series, Vol. 11.

The process of designing the spot array generation gratings begins by applying scalar diffraction theory to predict the amplitude relationships for the set of spots. Next, these relationships are matched with criteria describing the array size, intensity uniformity, and desired efficiency and then provided as constraints to an optimization program. As disclosed in J. Jahns, M. M. Downs, M. E. Prise, N. Stribl, and S. J. Walker, "Dammann Gratings for Laser Beam Shaping," Optical Engineering 28(12), 1267-1275 (1989), the number of transitions needed to describe a specific spot array generated by binary phase gratings grows with the size of the array, and the resulting complexity of determining a reasonable solution grows exponentially with the array size. Therefore, the ability to locate a satisfactory solution for larger array sizes is restricted by the computational resources available. Indeed, if the transition regions are not constrained to two possible phase levels, the complexity of the corresponding solution may become even greater.

Fortunately, symmetry properties are incorporated into the grating design to significantly reduce the number of independent parameters required for a solution. In the description which follows, some of the symmetry properties that have been used to reduce the complexity of locating an optimal solution set are first reviewed. Specific symmetries that were introduced to produce an even numbered spot array design are then described and extended. The solution for a general functional representation of phase surface with reflection symmetry about the period midpoint and the application of translational symmetry leading to the even-numbered array design are described. The previous results are then applied to discrete multi-level designs. Binary phase gratings and their inherent properties and several grating designs based on these symmetries are then described.

A general representation of a phase diffraction grating consists of a periodic repetition of a transparent surface relief pattern that imposes a space variant phase shift on an impinging monochromatic plane wave. The diffractive effect of this structure leads to a periodic array of spots in the far field whose intensity is given by the Fraunhofer approximation to scalar diffraction theory. FIG. 4 illustrates a setup that creates such a spot array. The grating is specifically designed to modulate only the phase of the plane wave so that no light intensity is absorbed. When the intensity distribution of the illuminating beam covers an area that is significantly larger than the size of a single period, the amplitude of each order is essentially given by the Fourier transformation of the transmission function of the diffraction grating.

The expression $t(x,y) \exp[i\theta(x,y)]$ is used to represent the functional relationship describing the grating's modification of the incident plane of light. Here $t(x,y)$ represents the amplitude transmission and $\theta(x,y)$ gives the phase modulation of the plane wave. A value of $t(x,y)=1$ represents non-attenuated light energy while a value of zero represents a fully attenuated light beam. When gratings are fabricated in an optically transparent material, the $t(x,y)$ term may be ignored. The exponential term, $\theta(x,y)$, gives the relative phase delay imparted by the grating on the impinging light. A delay of the wave by one wavelength, $\lambda$, corresponds to a phase shift of $2\pi$. Since phase shifts that differ by multiples of $2\pi$ represent effectively equivalent wave fronts, the range of phase shift values is ultimately restricted to lie between 0 and $2\pi$. The maximum difference between two phase levels thus approaches $2\pi$ and is equivalent to an optical material of thickness, $t$, given by $$t = \frac{\lambda}{\Delta n}, \qquad [2\text{-}1]$$

where $\Delta n$ is the difference between the indices of refraction of the grating material and the surrounding environment. If, for example, fused silica is used as a substrate surrounded by air, the maximum level difference required would be about 2.2 wavelengths. The relative amplitude of a spot at a specific order is given by the equation, $$A(n_x, n_y) = \qquad [2\text{-}2]$$
$$\int_0^1 \int_0^1 t(x,y) \exp[i\theta(x,y)] \exp[-2\pi i n_x x] \exp[-2\pi i n_y y] dx dy.$$

where $n_x$ and $n_y$ designate the order of the spots in the x and y dimension respectively, and by convention the coordinates are normalized to a unit period in both dimensions. If an objective lens having a focal length f is used to form the image and the grating is illuminated by a monochromatic plane wave of wavelength λ, the orders in the output spot array in each dimension are spaced by an amount, $$S = \frac{\lambda f}{P}. \qquad [2\text{-}3]$$

where P is the size of one period of the pattern in the corresponding dimension. The actual spot size and intensity distribution depends on the characteristics of the illuminating beam and aberrations inherent in the lens system.

In this description, only regular rectangular arrays having independent performance in each dimension are described. Thus the amplitude and phase terms can be separated as $t(x,y) = t(x) \, t(y)$ and $\theta(x,y) = \theta(x) \, \theta(y)$. Using this simplification, the analysis is separated into two single one-dimensional solutions and, if necessary, the solutions combined to create a two-dimensional spot array.

Unfortunately, the determination of a suitable phase profile that satisfies specific spot array intensity distribution criteria can not be approached via analytic means. Optimization techniques are necessary to locate the solution that adequately represents the surface. Since the parameterization of the surface is described by sets of coefficients associated with some set of basis functions (for the case of continuous function descriptions) or a set of transitions and phase levels (for discrete representations) it is advantageous to select topologies that either reduce the complexity of the optimization process. Reflection symmetry and translational symmetry are used here to substantially reduce the optimization complexity.

One of the primary objectives in designing a regular rectangular array is to ensure that all the intensities, in particular a positive and negative order pair, have the same value. It is first shown how the reflection of the transmission function about the center point of the pattern leads to matching order intensities. Since many of the simplification steps for the various symmetry conditions are similar, the first proofs are examined in detail to show the nature of the process.

First, one period of the structure is analyzed to determine the spot amplitude, $A(n)$, given at each order, $n$, using the Fourier transform of one period, $$A(n) = \int_0^1 t(x) \exp[i\theta(x)] \exp[-2\pi i n x] dx. \qquad [2\text{-}4]$$

The transmission, $t(x)$, is limited to the range $0 < t(x) < 1$. The intensity of each order, $I(n)$, is calculated by taking the complex square of this amplitude.

In order to ensure that the intensities of a specific negative and positive order are equivalent, the intensities must satisfy the relationship $$I(n) = A(n) \cdot A^*(n) = A(-n) \cdot A^*(-n) = I(-n), \qquad [2\text{-}5]$$

where $A^*(n)$ is the complex conjugate of the amplitude. This implies that either $A(n) = \exp[i\phi] A(-n)$ or $A(n) = \exp[i\phi] A^*(-n)$, where $\phi$ is an arbitrary angle. As discussed later herein, the second condition is automatically satisfied for the case of a binary phase grating, while the first condition is met by using a reflection symmetry in the grating pattern.

The equation that describes the negative order amplitude is given by $$A(-n) = \int_0^1 t(x) \exp[i\theta(x)] \exp[2\pi i n x] dx. \qquad [2\text{-}6]$$

By making the change of variable, $x' = 1 - x$, the integral becomes $$A(-n) = \int_0^1 t(1 - x') \exp[i\theta(1 - x')] \exp[-2\pi i n x'] dx'. \qquad [2\text{-}7]$$

The symmetry condition that will ensure that order pairs given by equations [2-4] and [2-7] are the same intensity is the requirement that the first half of the period be a mirror image of the second half differing at most by a phase offset given by $\phi$. This is expressed by $$t(1-x) = t(x),$$

and $$\theta(1-x) = \theta(x) + \phi. \qquad [2\text{-}8]$$

FIG. 21 shows how one period of the phase shift structure would appear if the midpoint of the period is used as the reflection point and a phase offset of $\phi = 0$ is used. If these symmetry conditions are inserted into the amplitude solution, the general solution is simplified in the following manner. First, the integral is divided into two halves, $$A(n) = \int_0^{\frac{1}{2}} t(x) \exp[i\theta(x)] \exp[-2\pi i n x] dx + \int_{\frac{1}{2}}^1 t(x) \exp[i\theta(x)] \exp[-2\pi i n x] dx. \qquad [2\text{-}9]$$

Substituting the reflection symmetries expressed by equation [2-8] into the second integral, the formula becomes $$A(n) = \int_0^{\frac{1}{2}} t(x) \exp[i\theta(x)] \exp[i\phi] \exp[-2\pi i n x] dx + \int_{\frac{1}{2}}^1 t(1 - x) \exp[i\theta(1 - x)] \exp[i\phi] \exp[-2\pi i n x] dx. \qquad [2\text{-}10]$$

Making the change variables $x' = 1 - x$ in the second integral results in, $$A(n) = \int_0^{\frac{1}{2}} t(x) \exp[i\theta(x)] [\exp[-2\pi i n x] + \exp[i\phi] \exp[2\pi i n x]] dx \qquad [2\text{-}11]$$

Thus it has been shown that the design of a diffraction grating requires information on only one half of the period. If the choice of $\phi$ is restricted to either 0 or $\pi$ and it is assumed that there is no attenuation (i.e., $t(x) = 1$), equation [2-11] becomes $$A(n) = 2 \int_0^{\frac{1}{2}} \exp[i\theta(x)] \cos(2\pi n x) dx \qquad [2\text{-}12]$$

or,

-continued $$A(n) = -2i \int_0^{\frac{1}{2}} \exp[i\theta(x)]\sin(2\pi nx)dx. \quad [2\text{-}13]$$

Thus, application of this reflection symmetry has simplified the optimization process. If the surface is to be represented by a continuous function, the choice of basis functions can be limited to a set of either even or odd symmetric functions. When the solution is parameterized by a set of transitions and phase levels, only one half of the transition points of each solution set are independent and need to be optimized. Since the complexity of the optimization problem grows exponentially with the number of independent transitions, this reduction is critical.

The previous description illustrated that the reflection of half of the pattern about the midpoint of the period leads to the condition that both the negative and corresponding positive order intensities are equal. In the following description, it is shown that the translation of a section of a period with an additional phase offset leads to a property that is desirable in spot array generation, namely even-numbered spot arrays.

The analysis begins with the general solution expressed in equation [2-4]. As before, the integral is split into two regions and the effects of adding a translational shift are examined. The translational symmetry is expressed by $$t(x) = t(x - \tfrac{1}{2}), \text{ for } \tfrac{1}{2} \leq x \leq 1.$$

$$\theta(x) = \theta(x - \tfrac{1}{2}) + \phi, \quad [3\text{-}1]$$

where $\phi$ is an arbitrary phase angle. If $\phi$ is equal to 0 or $2\pi$, the pattern is replicated twice as often per period and the result is trivial. Substituting equation [3-1] into the integral of equation [2-4] yields $$A(n) = \int_0^{\frac{1}{2}} t(x)\exp[i\theta(x)]\exp[-2\pi inx]dx + \quad [3\text{-}2]$$

$$\int_{\frac{1}{2}}^{1} t(x - \tfrac{1}{2})\exp[i\theta(x - \tfrac{1}{2})]\exp[i\phi]\exp[-2\pi inx]dx.$$

After making a change of variables $x' = x - \tfrac{1}{2}$ in the second integral, the terms can be combined to form $$A(n) = \int_0^{\frac{1}{2}} t(x)\exp[i\theta(x)]\exp[-2\pi inx][1 + (-1)^n \exp[i\phi]]dx \quad [3\text{-}3]$$

An interesting result occurs when $\phi$ is chosen so that particular orders have zero amplitude. When $\phi$ is chosen to be $\pi$, then, $$A(n) = 0,$$

for n even, and $$A(n) = 2 \int_0^{\frac{1}{2}} t(x)\exp[i\theta(x)]\exp[-2\pi inx]dx, \text{ for } n \text{ odd}. \quad [3\text{-}4]$$

Thus applying the translation of the pattern and setting the phase offset of the resultant shifted region to $\pi$ leads to a natural suppression of all even orders including the zero order. Next, the condition that $I(n) = I(-n)$ is enforced. The analysis proceeds in the same manner as in the previous section, that is, reflection symmetry of a quarter section of the pattern about the midpoint of the half period unit is required. In this case, the midpoint $\tfrac{1}{4}$ is used, with the conditions represented as $$t(x) = t(\tfrac{1}{2} - x), \text{ for } \tfrac{1}{4} \leq x \leq \tfrac{1}{2}.$$

$$\theta(x) = \theta(\tfrac{1}{2} - x) + \phi', \quad [3\text{-}5]$$

where $\phi'$ is an arbitrary phase offset. One period of the phase relief is shown in FIG. 22 where the offset, $\phi'$ is chosen to be 0. The center arrow in FIG. 22 denotes the point about which the translational symmetry is maintained and the other two arrows mark the points of reflection symmetry of the smaller half periods. Simplification of [3-4] is made by splitting the integral into two halves, $0 < x < \tfrac{1}{4}$ and $\tfrac{1}{4} < x < \tfrac{1}{2}$, applying the symmetry condition, and combining the two results. This leads us to the formula $$A(n) = 2 \int_0^{\frac{1}{4}} t(x)\exp[i\theta(x)][\exp[-2\pi inx] - \exp[i\phi']\exp[2\pi inx]]dx. \quad [3\text{-}6]$$

The same result could also be arrived at in a different manner by applying two sets of symmetric reflections about the mid- and quarter-points, where one reflection has a phase offset of $\pi$. Again, simplification will result if $\phi'$ is chosen to be either 0 or $\pi$. Finally, it is noted that the design of this even number grating requires knowledge of only one quarter of the full period.

Even numbered designs are useful for a variety of applications. FIGS. 1 and 2 illustrate the difference between the standard spot array, e.g., a 5×5 array (FIG. 1), and a spot array generated by the even numbered design, e.g., a 4×4 array (FIG. 2). The even numbered spot array contains an even number of spots along one dimension, where high intensity orders alternate with suppressed orders. This design is advantageous since it eliminates the central order. Normally, the central order amplitude, when evaluated for discrete grating patterns, leads to a functional dependence on $\theta(x)$ that is different from the other orders. This difference leads to a dramatic sensitivity of the zero order intensity on the phase depth. With the even numbered design, this sensitivity becomes less critical since the spot is no longer an important constituent of the regular array.

The results presented so far have been derived for the case of a general functional representation of the grating surface. During the actual fabrication of diffraction gratings, one relies on lithographic methods that have been developed for the semiconductor industry. These methods result in a surface profile that is composed of a set of discrete phase levels. The number, L, of phase levels is finite (often $2^m$ levels) and is determined by the number, m, of repeated fabrication steps. Therefore it is necessary to derive the formulae for patterns that are modeled as sets of discrete phase levels.

First, the general solution for the amplitude of the one-dimensional structure shown in FIG. 20 is derived. The structure is periodic with N phase transitions [$x_1$, $x_2$, $x_3$, ..., $x_N$]. The light traveling through the area between $x_{i-1}$ and $x_i$ differs in phase by an amount $\theta_i$ from a reference phase. In addition, the assignment $t(x) = 1$ is made, that is, no absorption occurs. The coordinate system is normalized so that unit length is equal to one period, therefore, all transitions exist in the range [0,1]. Thus the periodic nature of the N transitions and phases is expressed by $x_i+1 = x_{i+N}$ and $\theta_i = \theta_{i+N}$. The form for the intensity equation is shift invariant in both position and phase, thus all transitions and phase levels are relative.

As the case of discrete phase levels is solved, it is necessary to analyze $A(n)$ for two cases: n not equal to zero and n equal to zero. In the following analysis, the non-zero terms are analyzed first followed by the central order result.

First consider the general solution before symmetric properties have been incorporated. First equation [2-4] is expanded with order n not equal to zero. In performing the integral, the terms containing the initial and final boundary are isolated.

$$A(n) = \int_0^{x_1} \exp[-2\pi i n x]\exp[i\theta_1]dx + \qquad [4\text{-}1]$$

$$\sum_{k=2}^{N} \int_{x_{k-1}}^{x_k} \exp[-2\pi i n x]\exp[i\theta_k]dx +$$

$$\int_{x_N}^{1} \exp[-2\pi i n x]\exp[i\theta_{N+1}]dx$$

The second term becomes the series $$\frac{1}{2\pi i n} \sum_{k=2}^{N} \exp[i\theta_k]\,[\exp[-2\pi i n x_{k-1}] - \exp[-2\pi i n x_k]]. \qquad [4\text{-}2]$$

Evaluating the integrals of the first and third terms of equation [4-1] and using the periodic relatinships of the solution set $(x_o = x_N)$ yields $$\int_0^{x_1} \exp[-2\pi i n x]\exp[i\theta_1]dx + \int_{x_N}^{1} \exp[-2\pi i n x]\exp[i\theta_{N+1}]dx = \qquad [4\text{-}3]$$

$$\frac{\exp[i\theta_1]}{2\pi i n}[\exp[-2\pi i n x_0] - \exp[-2\pi i n x_1]].$$

It can be seen that this combination is the k=1 term of the series in equation [4-2], thus the full amplitude equation becomes $$A(n) = \frac{1}{2\pi i n} \sum_{k=1}^{N} \exp[i\theta_k]\,[\exp[-2\pi i n x_{k-1}] - \exp[-2\pi i n x_k]]. \qquad [4\text{-}4]$$

The terms of the series may be rearranged as a difference of phase shift terms as given by $$A(n) = \frac{1}{2\pi i n} \sum_{k=1}^{N} \exp[-2\pi i n x_k]\,[\exp[i\theta_{k+1}] - \exp[i\theta_k]]. \qquad [4\text{-}5]$$

This form can be computationally more efficient when the relative phases for each region are held static and only the transitions are varied during optimization. It is necessary to derive the zero order amplitude separately from that above. Equation [2-4] with n=0 gives, $$A(0) = \qquad [4\text{-}6]$$

-continued $$x_1\exp[i\theta_1] + (1 - x_N)\exp[i\theta_{N+1}] + \sum_{k=2}^{N}(x_k - x_{k-1})\exp[i\theta_k].$$

Using the periodic relationships for the transitions and phases this becomes $$A(0) = \sum_{k=1}^{N}(x_k - x_{k-1})\exp[i\theta_k] \qquad [4\text{-}7]$$

or equivalently, $$A(0) = \exp[i\theta_1] + \sum_{k=1}^{N} x_k[\exp[i\theta_k] - \exp[i\theta_{k+1}]] \qquad [4\text{-}8]$$

Together equations [4-5] and [4-8] describe the amplitudes of a generalized discrete level structure.

Except for the case of binary gratings, which we shall cover in the next section, the positive and negative order amplitudes given by the general solution are not guaranteed to be equal. In order to assure this condition, reflection symmetry is imposed about the midpoint of the period. Two possible configurations exist. In one case, a transition point exists at the location of the midpoint, and the phase offset is nonzero. For this case the symmetry conditions are (from equation [2-8]):

$$x_k = 1 - x_{N-k}, \text{ for } N/2+1 \leq k \leq N.$$

$$\theta_k = \theta_{N+1-k} + \phi. \qquad [4\text{-}9]$$

For the second case, the phase offset is zero and thus a transition point is not required at the midpoint. In this case the conditions are, $$x_k = 1 - x_{N+1-k}, \text{ for } N/2+1 \leq k \leq N.$$

$$\theta_k = \theta_{N+2-k} + \phi. \qquad [4\text{-}10]$$

where N is the total number of transitions. In either case, the result of evaluating equation [2-11] is, $$A(n) = \frac{1}{2\pi i n}[\exp[i\theta_1] - (-1)^n\exp[i\theta_{N/2}]](1 - \exp[i\phi]) + \qquad [4\text{-}11]$$

$$\frac{1}{2\pi i n} \sum_{k=1}^{N/2-1} [\exp[i\theta_{k+1}] - \exp[i\theta_k]]\,[\exp[-2\pi i n x_k] -$$

$$\exp[i\phi]\exp[2\pi i n x_k]].$$

If the phase offset is assigned the value 0, the amplitude equation reduces to $$A(n) = \frac{-1}{\pi n} \sum_{k=1}^{N/2-1} [\exp[i\theta_{k+1}] - \exp[i\theta_k]]\sin(2\pi n x_k). \qquad [4\text{-}12]$$

If the zero order amplitude is examined, the result is $$A(0) = 1/2[1 + \exp[i\phi]]\exp[i\theta_{N/2}] + \qquad [4\text{-}13]$$

$$\sum_{k=1}^{N/2-1} x_k[\exp[i\theta_k] - \exp[i\theta_{k+1}]][\exp[i\phi] + 1].$$

When the phase offset, $\phi$, is chosen to be zero this reduces to $$A(0) = \exp[i\theta_{N/2}] + \sum_{k=1}^{N/2-1} 2x_k[\exp[i\theta_k] - \exp[i\theta_{k+1}]] \quad [4\text{-}14]$$

while for $\phi$ equal to $\pi$ $A(0)=0$ is obtained. FIG. 23, which is phase plot for one period of a discrete multi-level phase grating with reflection symmetry about the period midpoint, illustrates a pattern with a value of 0 used for $\phi$.

It is now appropriate to examine the even numbered spot array solutions that are produced by applying both a translational shift with phase offset about the midpoint and a reflection about the half period midpoint. Using equation [3-1] it is required that $$x_k = x_{k-N/2} + \tfrac{1}{2}, \text{ for } N/2+1 \leq k \leq N$$

$$\theta_k = \theta_{k-N/2} + \pi. \quad [4\text{-}15]$$

Following this reflection symmetry is required about the midpoint to assure that the positive and negative orders have matching intensities. This symmetry (equation [3-5]) is given by, $$x_k = \tfrac{1}{2} - x_{N/2-k}, \text{ for } N/4+1 \leq k \leq N/2,$$

$$\theta_k = \theta_{N/4-k} + \phi. \quad [4\text{-}16]$$

FIG. 24 is a phase plot of one period for an even numbered multi-level phase grating pattern with translation about the midpoint, 0.5, and reflection symmetry about the points 0.25 and 0.75. (The pattern has had its phases reduced modulus $2\pi$.) If the reflection symmetry point is not a member of the transition set then $\phi$ must be chosen to be zero. Using the symmetries of equations [4-15] and [4-16], the value of the amplitudes are given by $$A(n) = 0, \text{ for } n \text{ even, and} \quad [4\text{-}17]$$

$$A(n) = \frac{1}{\pi i n} \sum_{k=1}^{N/4} [\exp[i\theta_{k+1}] - \exp[i\theta_k]]$$
$$[\exp[-2\pi i n x_k] - \exp[i\phi]\exp[2\pi i n x_k]]$$

for $n$ odd. Again, by choosing $\phi$ equal to either 0 or $\pi$ the $n$ odd amplitudes reduce to $$A(n) = \frac{-1}{\pi n} \sum_{k=1}^{N/4} [\exp[i\theta_{k+1}] - \exp[i\theta_k]] 2\sin(2\pi n x_k), \text{ and} \quad [4\text{-}18]$$

$$A(n) = \frac{1}{\pi i n} \sum_{k=1}^{N/4} [\exp[i\theta_{k+1}] - \exp[i\theta_k]] 2\cos(2\pi n x_k), \quad [4\text{-}19]$$

respectively.

It is evident that the application of symmetry properties has simplified the optimization problem. In the case of the standard design where only the reflection symmetry is incorporated, the number of independent transitions has been cut to half the total number. When an even numbered design using both translational and reflectional symmetry is optimized, only one fourth of the transitions are independent.

The simplest fabrication scheme for manufacturing diffraction gratings is to either etch or deposit a pattern on an optical substrate leaving two levels that differ by a predetermined phase. Such binary phase gratings are constructed using a single step procedure that eliminates the critical alignment process required at each step of multi-level fabrication. Because of an inherent symmetry property in the binary phase model, reflection symmetry is not necessary to guarantee that positive and negative orders are equivalent. Although this inherent symmetry was not initially exploited in the design of Dammann gratings, others have removed the reflection symmetry and located solutions with better efficiencies as disclosed in U. Killat, G. Rabe, and W. Rave, "Binary Phase Gratings for Star Couplers with High Splitting Ratios," Fiber and Integrated Optics 4, 159-164 (1982). In the following analysis, this natural property of standard binary phase gratings is investigated as well as the use of translational symmetry to create even numbered gratings.

For the case of a binary phase grating, the phase delays for the two levels are described by $$\theta_k = \theta_0 + (-1)^k \Delta\theta/2. \quad [5\text{-}1]$$

where $\theta_0$ represents an arbitrary reference level midway between the two levels and $\Delta\theta$ is the phase difference between the two. Since the $\theta_0$ term cancels in the intensity calculation, i.e. the intensity is invariant to the absolute phase, it is dropped from further analysis. Thus, the term which is dependent on the relative phases can be simplified as, $$\exp[i\theta_k] - \exp[i\theta_{k+1}] = \exp[i(-1)^k\Delta\theta/2] - \exp[-i(-1)^k\Delta\theta/2] = 2i(-1)^k\sin(\Delta\theta/2). \quad [5\text{-}2]$$

When this is applied to equations [4-8] and [4-8] the $n$th order amplitude becomes $$A(n) = \frac{\sin(\Delta\theta/2)}{\pi n} \sum_{k=1}^{N} (-1)^k \exp[-2\pi i n x_k]. \quad [5\text{-}3]$$

and the central order amplitude is given by $$A(0) = \exp[i\theta_1] + 2\sin(\Delta\theta/2) \sum_{k=1}^{N} (-1)^k x_k. \quad [5\text{-}4]$$

At this point a determination is made as to whether the positive and negative orders are naturally equal. By examining equation [5-3], it is seen that $A(n) = -A^*(-n)$; therefore positive and negative orders have matching intensities. Accordingly, the only reason for applying any form of symmetry to binary phase gratings is to create the novel even numbered solutions.

Although it is by no means necessary, it is often convenient to choose $\Delta\theta = \pi$. By doing so one can form a two dimensional spot array by using two one-dimensional solutions, and, when the phase delays are reduced to the range $[0, 2\pi]$, still have a binary phase surface. If the phase difference is set equal to $\pi$, equation [5-3] becomes $$A(n) = \frac{1}{\pi n} \sum_{k=1}^{N} (-1)^k \exp[-2\pi i n x_k], \quad [5\text{-}5]$$

and the central order amplitude becomes, $$A(0) = \exp[i\theta_1] + 2 \sum_{k=1}^{N} (-1)^k \exp[i\theta_k]. \quad [5\text{-}6]$$

As has been seen in the previous sections, the design of an even numbered solution requires that a translational symmetry exist in the pattern. It can be shown that the resulting amplitudes are $$A(n) = \frac{2}{\pi n} \sum_{k=1}^{N/2} (-1)^k \exp[-2\pi i n x_k], \text{ for } n \text{ odd, and} \quad [5\text{-}7]$$

$$A(n) = 0, \text{ for } n \text{ even.}$$

where the number of transitions in the first half of the period, N/2, must be be odd. In general, for each solution of a binary phase grating pattern, the number of independent transitions will be about one half of the number of spots. FIGS. 25 and 26, respectively, show standard and even numbered designs using a binary phase format.

In the above description, it has been shown that the incorporation of symmetries into the design of spot array diffraction gratings can simplify the surface parametrization. The solutions associated with FIGS. 21-22 and 23-26 are now described, proceeding in the reverse order from the earlier description, i.e., first illustrating the binary phase gratings that are relatively simple to fabricate, then describing the multi-level gratings, and then describing the continuous surface profile solutions.

The design in FIG. 25 shows a binary level pattern that produces a one dimensional line of 13 spots. The phase level difference is equal to a $\pi$ phase delay. The transition set is given by [0.0000, 0.1289, 0.3233, 0.5862, 0.6139, 0.7290, 0.7919, 0.9074] in units of the period. The pattern has a theoretical efficiency of diffracting 78.0% of the incoming energy into the desired 13 spots. Note that since matching positive and negative order intensities naturally occurs in a binary phase grating, there is no observable symmetry present in the pattern.

An example of translational symmetry in a binary phase grating is shown in FIG. 26. This design produces an 8 spot array with 75.9% of the energy distributed to the desired orders. The data set for the transitions is [0.0000, 0.1812, 0.2956, 0.3282, 0.4392, 0.5000, 0.6812, 0.7956, 0.8282, 0.9392]. It can be easily verified that the transitions in the second half of the period are translated by an amount 0.5 from the first half.

The multi-level 1×13 design shown in FIG. 23 was obtained as an 8-level pattern although only 7 levels were used in this design. The vertical axis labels the levels from 0 through 6 with each increment equal to an additional phase shift of $\pi/4$. The transition set solution is given by [0.0747, 0.1164, 0.1257, 0.2196, 0.3358, 0.4113, 0.4477, 0.5523, 0.5887, 0.6642, 0.7804, 0.8743, 0.8836, 0.9253]. Note that in this case the points 0. and 1.0 are not transition points in the solution set. The corresponding phase values for this solution are [0, 1, 0, 6, 2, 4, 2, 0, 2, 4, 2, 6, 0, 1, 0]. This solution has an efficiency of 82.8% and would require three etch/deposition steps to fabricate. Only the reflection symmetry about the point 0.5 is required in this design.

FIG. 24 shows a 4 level pattern for creating a 1×8 spot array. The transition solution set is [0.0000, 0.0632, 0.0931, 0.1548, 0.3452, 0.4069, 0.4368, 0.5000, 0.5632, 0.5931, 0.6548, 0.8452, 0.9069, 0.9368] and the corresponding phases are [2, 0, 1, 2, 3, 2, 1, 0, 2, 3, 0, 1, 0, 3, 2]. Each level corresponds to an additional $\pi/2$ phase delay. The transitions of the first period are translated into the second half and the phase levels in the second half are increased by $\pi$ and then reduced modulus $2\pi$ to the illustrated values. This multi-level solution demonstrates the translational and reflection symmetry required for an even numbered solution. The efficiency of this solution is 85.3% and the fabrication would require only two etch or deposition steps.

Finally, two continuously varying solutions are shown in FIGS. 21 and 22. The profiles of each were parametrized using Legendre polynomials. Neither of these solutions have been folded to fit within the range [0,2$\pi$]. FIG. 21 shows a surface profile that produces a 1×13 spot array with an efficiency of 93%. Six parameters are needed to specify the surface. The pattern shows a reflection symmetry about the point 0.5. FIG. 22 shows a surface profile that would produce a 1×8 spot array with a theoretical 95% efficiency. Four parameters are needed to specify this profile. The translation symmetry and the reflection about the points 0.25 and 0.75 in each half period can be seen as well as the $\pi$ phase offset. In order to fabricate a discrete level grating based on this design, the profile is converted to a series of discrete levels and further optimization of the discrete solution is performed to eliminate potential nonuniformities that were introduced. Preliminary studies indicate that the efficiency loss resulting from the transformation from continuous to discrete levels could be limited to about one percent.

An optical system illustrating the present invention is shown in FIG. 27. The system comprises a plurality of stages and implements a multi-stage switching network, illustratively of the type disclosed in U.S. patent application Ser. No. 07/349,281 of T. J. Cloonan et al. filed on May 8, 1989, allowed on May 20, 1991, now U.S. Pat. No. 5,077,483 issued Dec. 31, 1991 and assigned to the assignee of the present invention. The optical system comprises a plurality of stages each including means (e.g., 120, 130, or 140) for generating a monochromatic plane wave of light, a phase diffraction grating (e.g., 121, 131, 141), and an array (e.g., 150) of N×M optical devices, e.g., symmetric self electro-optic effect devices or S-SEEDS. Grating 131, for example, has a surface relief pattern formed therein such that the grating is responsive to a plane wave of light for transmitting light from the surface relief pattern to form an array of N×M spots, where N and M are even integers, the N spots are substantially equally spaced, and the M spots are substantially equally spaced. The array of N×M optical devices is responsive to the array of N×M spots conveyed to the device array via an optical hardware module 110.

It is to be understood that the above-described embodiments are merely illustrative of the principles of the invention and that many variations may be devised by those skilled in the art without departing from the spirit and scope of the invention. It is therefore intended that such variations be included within the scope of the claims.

I claim:

1. A phase diffraction grating having a surface relief pattern formed therein such that, when a monochromatic plane wave of light is transmitted to said grating, light is transmitted from said surface relief pattern to form an array of N spots, where N is an even integer and said N spots are substantially equally spaced where said surface relief pattern comprises two levels and has a set of transitions between said two levels, said set of transitions comprising a plurality of periods of length P, each period comprising a plurality of transitions between said two levels, such that when said plane wave of light is of wavelength $\lambda$, and said N spots are formed by passing said transmitted light through an objective lens of focal length f, the substantially equal spacing S of said N spots is given by $$S = 2 \frac{\lambda f}{P}.$$

2. A grating in accordance with claim 1 wherein said two levels are separated by a phase depth substantially equal to $\pi$.

3. A grating in accordance with claim 1 where said N spots are formed in a line and, with respect to a plurality of orders spaced apart by a spacing ½ S and comprising a central order and even and odd orders on each side of said central order, said N spots correspond to said odd orders.

4. A grating in accordance with claim 1 wherein said plurality of transitions comprises transitions in a first half of said each period, and transitions in a second half of said each period obtainable by a translation of said first half period transitions and having a phase offset substantially equal to $\pi$ with respect to said first half period transitions.

5. A grating in accordance with claim 1 where said N spots are of substantially equal intensity.

6. A grating in accordance with claim 1 where said N spots are formed by transmitting said plane wave of light through said grating.

7. A grating in accordance with claim 1 where said N spots are formed by reflecting said plane wave of light from said grating.

8. A grating in accordance with claim 1 wherein said surface relief pattern has first and second dimensions such that when said monochromatic plane wave of light is transmitted to said grating, said light transmitted from said surface relief pattern forms a two-dimensional array of N×M spots comprising lines of N spots in said first dimension and lines of M spots in said second dimension, where M is also an even integer and said M spots are also substantially equally spaced.

9. A grating in accordance with claim 1 wherein said surface relief pattern is obtained using simulated annealing.

10. A phase diffraction grating having a surface relief pattern formed therein such that, when a monochromatic plane wave of light is transmitted to said grating, light is transmitted from said surface relief pattern to form an array of N spots, where N is an even integer and said N spots are substantially equally spaced,
where said surface relief pattern comprises L levels, L being a positive integer greater than two, said surface relief pattern having a set of transitions between ones of said L levels, said set of transitions comprising a plurality of periods of length P, each period comprising a plurality of transitions between ones of said L levels such that when said plane wave of light is of wavelength $\lambda$, and said N spots are formed by passing said transmitted light through an objective lens of focal length f, the substantially equal spacing S of said N spots is given by $$S = 2\frac{\lambda f}{P}.$$

11. A grating in accordance with claim 10 wherein said L levels are separated by a phase depth substantially equal to $$\frac{2\pi}{L}.$$

12. A grating in accordance with claim 10 where said N spots are formed in a line and, with respect to a plurality of orders spaced apart by a spacing ½ S and comprising a central order and even and odd orders on each side of said central order, said N spots correspond to said odd orders.

13. A grating in accordance with claim 10 wherein said plurality of transitions comprises transitions in a first half of said each period, and transitions in a second half of said each period obtainable by a translation of said first half period transitions and having a phase offset substantially equal to $\pi$ with respect to said first half period transitions.

14. A grating in accordance with claim 13 wherein said first half period transitions comprise transitions in a first quarter of said each period, and transitions in a second quarter of said each period obtainable by reflection of said first quarter period transitions about a midpoint of said first half period.

15. A grating in accordance with claim 10 where said N spots are of substantially equal intensity.

16. A grating in accordance with claim 10 where said N spots are formed by transmitting said plane wave of light through said grating.

17. A grating in accordance with claim 10 where said N spots are formed by reflecting said plane wave of light from said grating.

18. A grating in accordance with claim 10 wherein said surface relief pattern has first and second dimensions such that when said monochromatic plane wave of light is transmitted to said grating, said light transmitted from said surface relief pattern forms a two-dimensional array of N×M spots comprising lines of N spots in said first dimension and lines of M spots in said second dimension, where M is also an even integer and said M spots are also substantially equally spaced.

19. A grating in accordance with claim 10 wherein said surface relief pattern is obtained using simulated annealing.

20. A phase diffraction grating having a surface relief pattern formed therein such that, when a monochromatic plane wave of light is transmitted to said grating, light is transmitted from said surface relief pattern to form an array of N spots, where N is an even integer and said N spots are substantially equally spaced
where said surface relief pattern comprises a continuous surface comprising a plurality of periods of length P such that when said plane wave of light is of wavelength $\lambda$, and said N spots are formed by passing said transmitted light through an objective lens of focal length f, the substantially equal spacing S of said N spots is given by $$S = 2\frac{\lambda f}{P}.$$

21. A grating in accordance with claim 20 where said N spots are formed in a line and, with respect to a plurality of orders spaced apart by a spacing ½ S and comprising a central order and even and odd orders on each side of said central order, said N spots correspond to said odd orders.

22. A grating in accordance with claim 20 wherein each of said plurality of periods comprises a first half period, and a second half period obtainable by a translation of said first half period and having a phase offset substantially equal to $\pi$ with respect to said first half period.

23. A grating in accordance with claim 22 wherein said first half period comprises a first quarter period, and a second quarter period obtainable by reflection of said first quarter period about a midpoint of said first half period.

24. A grating in accordance with claim 20 where said N spots are of substantially equal intensity.

25. A grating in accordance with claim 20 where said N spots are formed by transmitting said plane wave of light through said grating.

26. A grating in accordance with claim 20 where said N spots are formed by reflecting said plane wave of light from said grating.

27. A grating in accordance with claim 20 wherein said surface relief pattern has first and second dimensions such that when said monochromatic plane wave of light is transmitted to said grating, said light transmitted from said surface relief pattern forms a two-dimensional array of N×M spots comprising lines of N spots in said first dimension and lines of M spots in said second dimension, where M is also an even integer and said M spots are also substantially equally spaced.

28. A grating in accordance with claim 20 wherein said surface relief pattern is obtained using simulated annealing.

29. Optical spot-generating apparatus comprising
means for generating a monochromatic plane wave of light of wavelength $\lambda$,
an objective lens of focal length f, and
a phase diffraction grating responsive to said plane wave of light and having a surface relief pattern comprising a plurality of periods of length P for transmitting light from said surface relief pattern through said lens to form an array of N spots, where N is an even integer and said N spots are substantially equally spaced at a spacing S given by $$S = 2\frac{\lambda f}{P}.$$

30. Apparatus comprising
an objective lens of focal length f, and
a phase diffraction grating responsive to a monochromatic plane wave of light of wavelength $\lambda$, said grating having a surface relief pattern comprising a plurality of periods of length P for transmitting light from said surface relief pattern through said lens to form an array of N spots, where N is an even integer and said N spots are substantially equally spaced at a spacing S given by $$S = 2\frac{\lambda f}{P}.$$

31. A method of forming a surface relief pattern in a phase diffraction grating such that when a monochromatic plane wave of light is transmitted to said grating, light is transmitted from said surface relief pattern to form an array of N spots, where N is an even integer and said N spots are substantially equally spaced, said method comprising
forming first half periods of a plurality of periods of length P which comprise said surface relief pattern, and
forming second half periods of said plurality of periods, said second half periods obtained by a translation of said first half periods and having a phase offset substantially equal to $\pi$ with respect to said first half periods.

32. A method in accordance with claim 31 wherein said surface relief pattern comprises two levels and has a set of transitions between said two levels, each of said plurality of periods comprising a plurality of transitions between said two levels, said forming said first half periods comprising
forming transitions in said first half periods, and said forming said second half periods comprising
forming transitions in said second half periods, said transitions in said second half periods obtained by a translation of said first half period transitions and having a phase offset substantially equal to $\pi$ with respect to said first half period transitions.

33. A method in accordance with claim 31 wherein said surface relief pattern comprises L levels, L being a positive integer greater than two, each of said plurality of periods comprising a plurality of transitions between ones of said L levels, said forming said first half periods comprising
forming transitions in said first half periods, and said forming said second half periods comprising
forming transitions in said second half periods, said transitions in said second half periods obtained by a translation of said first half period transitions and having a phase offset substantially equal to $\pi$ with respect to said first half period transitions.

34. A method in accordance with claim 33 wherein said forming transitions in said first half periods comprises
forming transitions in first quarter periods of said first half periods, and
forming transitions in second quarter periods of said first half periods, said second quarter period transitions obtained by reflection of said first quarter period transitions about midpoints of said first half periods.

35. A method in accordance with claim 31 wherein said surface relief pattern comprises a continuous surface, said forming said first half periods comprising
forming first quarter periods of said first half periods, and
forming second quarter periods of said first half periods obtained by reflection of said first quarter periods about midpoints of said first half periods.

* * * * *

UNITED STATES PATENT AND TRADEMARK OFFICE
CERTIFICATE OF CORRECTION

PATENT NO. : 5,113,286
DATED : May 12, 1992
INVENTOR(S) : Rick L. Morrison

It is certified that error appears in the above-indentified patent and that said Letters Patent is hereby corrected as shown below:

Column 8, line 65, equation 6 should be $$x_k = x_{k-N/2} + 0.5 , \quad \text{for } N/2+1 \leq k \leq N \qquad [6]$$

Column 20, line 1, equation 4-6 should be $$A(0) = x_1 \exp[i\theta_1] + (1 - x_N) \exp[i\theta_{N+1}] + \sum_{k=2}^{N} (x_k - x_{k-1}) \exp[i\theta_k] . \qquad [4\text{-}6]$$

Column 20, line 32, equation 4-9 should be $$x_k = 1 - x_{N-k}, \quad \text{for } N/2+1 \leq k \leq N,$$

$$\theta_k = \theta_{N+1-k} + \phi , \qquad [4\text{-}9]$$

UNITED STATES PATENT AND TRADEMARK OFFICE
CERTIFICATE OF CORRECTION

PATENT NO. : 5,113,286
DATED : May 12, 1992
INVENTOR(S) : Rick L. Morrison

It is certified that error appears in the above-indentified patent and that said Letters Patent is hereby corrected as shown below:

Column 21, line 41, equation 4-17 should be $$A(n) = 0, \text{ for n even, and} \qquad [4\text{-}17]$$

$$A(n) = \frac{1}{\pi i n} \sum_{k=1}^{N/4} \left[ \exp[i\theta_{k+1}] - \exp[i\theta_k] \right] \left[ \exp[-2\pi i n x_k] - \exp[i\phi] \exp[2\pi i n x_k] \right]$$

Signed and Sealed this

Third Day of August, 1993

Attest:

MICHAEL K. KIRK

*Attesting Officer*    Acting Commissioner of Patents and Trademarks